United States Patent [19]

Young

[11] 4,337,414

[45] Jun. 29, 1982

[54] COMPACT FLUORESCENT LAMP HAVING CONVOLUTED TUBULAR ENVELOPE OF TRIDIMENSIONAL CONFIGURATION, METHOD OF MAKING SUCH ENVELOPE, AND LIGHTING UNIT INCORPORATING SUCH LAMP

[75] Inventor: Robert G. Young, Nutley, N.J.

[73] Assignee: Westinghouse Electric Corp., Pittsburgh, Pa.

[21] Appl. No.: 97,279

[22] Filed: Nov. 26, 1979

[51] Int. Cl.³ .................... H01J 7/44; H01J 17/34; H01J 19/78; H01J 1/62

[52] U.S. Cl. .................... 315/56; 313/493; 313/220; 313/204; 315/53; 65/108; 65/281

[58] Field of Search .................. 313/493, 44, 220, 204, 313/205; 315/53, 56, 59; 65/87, 108, 109, 110, 276, 277, 281

[56] References Cited

U.S. PATENT DOCUMENTS

| | | | |
|---|---|---|---|
| 1,898,615 | 2/1935 | Byrnes | 313/493 |
| 2,001,511 | 5/1935 | Uyterhoeven et al. | 313/493 |
| 2,200,940 | 5/1940 | Uyterhoeven et al. | 313/493 |
| 2,652,483 | 9/1953 | Laidig et al. | 313/493 |
| 3,047,763 | 7/1962 | Inman | 313/493 |
| 3,501,662 | 3/1970 | Plagge | 313/493 |
| 3,551,736 | 12/1970 | Doehner | 313/493 |
| 3,646,383 | 2/1972 | Jones et al. | 313/493 |
| 3,815,080 | 6/1974 | Summa | 339/52 R |
| 3,899,712 | 8/1975 | Witting | 313/493 |
| 3,953,761 | 4/1976 | Giudice | 315/71 |
| 3,993,465 | 11/1976 | Hurx et al. | 65/110 |
| 4,004,171 | 1/1977 | Heuvelmans et al. | 313/44 |
| 4,260,931 | 4/1981 | Wesselink et al. | 313/493 |
| 4,270,071 | 5/1981 | Morton | 313/204 |
| 4,283,217 | 8/1981 | Kawamura | 313/493 |
| 4,300,073 | 11/1981 | Skwirut et al. | 313/493 |

FOREIGN PATENT DOCUMENTS

| | | | |
|---|---|---|---|
| 49-28294 | 12/1977 | Japan | 313/493 |
| 49-28295 | 12/1977 | Japan | 313/493 |
| 55-137659 | 10/1980 | Japan | 313/493 |
| 600061 | 3/1948 | United Kingdom | 313/493 |
| 774475 | 5/1957 | United Kingdom | 313/493 |
| 854745 | 11/1960 | United Kingdom | 313/493 |
| 876084 | 8/1961 | United Kingdom | 313/493 |
| 1514281 | 6/1978 | United Kingdom | 313/493 |

*Primary Examiner*—Saxfield Chatmon, Jr.
*Attorney, Agent, or Firm*—D. S. Buleza

[57] ABSTRACT

A fluorescent lamp of high brightness and compact size is provided by forming the envelope from vitreous tubing that is bent upon itself in such a manner that the envelope has either five or seven U-shaped sections which are disposed in tridimensional array and define a single convoluted discharge channel. The U-shaped sections are so oriented that the tubular legs of the U's are positioned in side-by-side columnar relationship with each other and the sealed ends of the tubing are located adjacent one another. The lamp thus has an arc length that is more than six or eight times as long as the overall height dimension of the convoluted envelope and generates light in a very efficient manner. The retrobent fluorescent lamps are combined with a protective housing, a base structure and operating circuits of various types to provide convection-cooled lamp units that are small enough to be used in table lamps and similar lighting fixtures but have light outputs in excess of 1,500 lumens and efficacies in the order of 60 lumens per watt. Various arrangements for including the ballast and other circuit components either as integral parts of the lamp unit or as separate components which are housed in the lighting fixture and thus permitting the lamp units to be used as direct replacements for incandescent type lamps are disclosed. Method of manufacturing the various multi-U-bent envelopes from a single piece of glass tubing employing arcuate molding components and sequential bending operations are also disclosed.

21 Claims, 21 Drawing Figures

COMPACT FLUORESCENT LAMP HAVING CONVOLUTED TUBULAR ENVELOPE OF TRIDIMENSIONAL CONFIGURATION, METHOD OF MAKING SUCH ENVELOPE, AND LIGHTING UNIT INCORPORATING SUCH LAMP

CROSS-REFERENCE TO RELATED APPLICATIONS

This application discloses and claims subject matter which constitutes an improvement over that disclosed and claimed in copending applications Ser. No. 11,832 of H. Skwirut et al. and Ser. No. 11,836 of F. W. Hoeh (deceased), both of which were filed Feb. 13, 1979, are owned by the present assignee and relate to a screw-in type lighting unit that contains a triple-U-bent fluorescent lamp and to such a lamp in the form of a separate lamp component per se, respectively.

The subject matter of the present application is also related to concurrently-filed design application Ser. No. 97,280 of R. G. Young (the present applicant) which discloses and claims the design features of the multiple-U-bent fluorescent lamp components of this application, and concurrently-filed application Ser. No. 97,278 (now U.S. Pat. No. 4,270,071) of E. W. Morton that discloses and claims a composite base and ballast member for compact single-ended fluorescent lamps having convoluted tubular envelopes with three or more U-bent sections, which applications are assigned to the assignee of the present application.

BACKGROUND OF THE INVENTION

This invention generally relates to electric discharge lamps and has particular reference to a fluorescent lamp component and a fluorescent lamp unit that are suitable for use as compact light sources in various kinds of residential and commercial lighting fixtures that are designed for incandescent type lamps.

Electric discharge lamps having tubular envelopes which provide "three-dimensional" type light sources are generally well known in the art. For example, a fluorescent lamp unit of helical configuration that is formed by coupling several semi-circular lamps together is disclosed in U.S. Pat. No. 2,652,483 granted Sept. 15, 1953 to Laidig et al. Another type of tridimensional fluorescent lamp that is formed by joining several conventional tubular fluorescent lamps in "bundled" configuration and interconnecting them with suitable apertures in the tube walls is disclosed in U.S. Pat. No. 3,501,662 issued Mar. 17, 1970 to Plagge.

Discharge lamps which have tubular envelopes that are bent into various shapes to provide concentrated light sources are also known in the art. British Pat. No. 854,745 published Nov. 23, 1960 discloses a double-ended sodium-vapor discharge lamp (FIGS. 3 and 4) having a tubular envelope that is bent upon itself twice to provide three straight tubular segments that are disposed in parallel triangular-spaced relationship. A luminous discharge tube having an envelope that is formed from glass tubing which is bent upon itself eleven times to provide a corresponding number of U-shaped sections is disclosed in U.S. Pat. No. 1,898,615 granted Feb. 21, 1933 to Byrnes. A fluorescent lamp having a tubular envelope that is bent upon itself three times to provide three conjoined U-shaped sections is disclosed in Japanese Design Patent No. 437,860 granted Sept. 20, 1976 to Y. Takeda et al. A lighting unit consisting of a heat-conserving housing that encloses a gaseous discharge lamp having a tubular envelope which is also bent upon itself three times to provide three U-bends and four straight sections is disclosed in U.S. Pat. Nos. 2,001,511 and 2,200,940 granted to Uyterhoeven et al. A compact screw-in type fluorescent lamp unit having a partitioned cylindrical envelope or a tubular envelope that is bent upon itself to provide a U-shaped or a generally M-shaped envelope (FIG. 5 embodiment) is disclosed in U.S. Pat. No. 3,551,736 granted Dec. 29, 1970 to Doehner.

Fluorescent lamp units of various designs that also have screw-type bases and are adapted to be used in lighting fixtures in place of incandescent lamps have also been proposed in the prior art. A lamp unit of this kind having adapter means which accommodates a conventional straight tubular double-ended fluorescent lamp and contains a ballast transformer that is located within a threaded base member is disclosed in U.S. Pat. No. 3,815,080 granted June 4, 1974 to F. Summa. U.S. Pat. Nos. 3,899,712 to Witting and 3,953,761 to LoGiudice disclose other types of screw-in fluorescent lamp units that are provided with integral ballast means or circuit components.

A method of making a circular-shaped fluorescent lamp by bending a heat-softened tubular glass envelope around a curved jig is disclosed in U.S. Pat. No. 3,993,465 granted Nov. 23, 1976 to Hurx et al.

SUMMARY OF THE INVENTION

While the compact fluorescent lamps and lamp units of the prior art were generally satisfactory from the standpoint of providing a light source that was more efficient than an incandescent lamp having the same light output, they required special electrode and seal structures and/or envelopes that were very difficult and expensive to make on a mass production basis. In many cases, the envelopes of the prior art lamps were so shaped that the resulting lamp units (with their integral circuit components) were too large to permit the lamp units to be used in lighting fixtures and sockets designed for incandescent lamps. If the physical dimensions of these prior art fluorescent lamp units were reduced to conform with the space limitations of such lighting fixtures, the resulting decrease in the light output of the fluorescent lamp would reduce the level of illumination below that provided by an incandescent lamp which would normally be used in the fixture. In order to be realistically considered as a commercially practical substitute for incandescent lamps in fixtures of the type now being used for general lighting applications in homes and offices and the like where light intensities suitable for reading and similar tasks are required, a compact electrical discharge lamp unit should have a light output in the order of at least 1500 lumens and the lamp itself should operate with an efficacy of around 60 lumens per watt—and the physical dimensions of the lamp unit must still be small enough to permit the unit to be placed in the lighting fixture and coupled to its socket component.

In accordance with the present invention, a compact lamp unit is provided which contains a low-pressure discharge lamp component that is of such construction and shape that it not only meets the aforementioned performance and dimensional criteria but also avoids the manufacturing problems and commercial disadvantages of the prior art lamp units. The discharge lamp component comprises a fluorescent lamp that has a tubular envelope which is "folded" or bent upon itself in such a unique fashion that it is formed into an envelope that has either five or seven conjoined U-bent segments and provides an efficient tridimensional light source of high brightness and suitably compact size, the U-bent segments being so arranged that the sealed ends of the envelope are located adjacent one another where they can be readily secured to a base structure. In contrast to fluorescent lamps having convoluted envelops of triple-U-bent construction (such as those disclosed in the aforementioned copending applications Ser. Nos. 11,836 and 11,832), the longer arc length provided by the additional U-shaped sections employed in the convoluted fluorescent lamp of the present invention not only increases the light output of the lamp to a more commercially practical level but reduces the net effect of electrode losses, etc. and thus improves the lamp efficacy. In view of the increasing costs of electrical energy, the savings realized from the more efficient fluorescent lamp and lamp units provided by the present invention constitutes a real and important advantage.

Since the improved fluorescent lamp component employed in the power-conserving lamp unit of the present invention is basically a conventional straight tubular fluorescent lamp that has been bent into convoluted form to provide either five or seven U-shaped segments, it employs the same parts and basic technology used to manufacture conventional type fluorescent lamps and thus can be made at reasonable cost and will have the long useful life (9,000 hours or more) characteristic of conventional fluorescent lamps now being marketed.

In accordance with preferred embodiments, the retrobent fluorescent lamps having five or seven U-shaped segments are combined with a vented protective cover or housing and a bayonet-type base means that accommodates integral ballast and starter components to provide a lamp unit having dimensions which permit the unit to be used in table lamps and other lighting fixtures that are employed in homes and offices and are designed for incandescent type lamps. Prototype fluorescent lamp units embodying the invention and operated from conventional 120 volt alternating-current power outlets have produced from 1700 to 2600 lumens at efficacies of from 60 to 67 lumens per watt, depending upon the type of phosphor employed and the power loading at which the lamps are operated.

Various methods for manufacturing the multi-U-bent envelopes from straight pieces of glass tubing employing arcuate molding components and sequential bending operations which lend themselves to automated manufacturing techniques are also disclosed.

BRIEF DESCRIPTION OF THE DRAWINGS

A better understanding of the invention will be obtained from the exemplary embodiments shown in the accompanying drawings, wherein.

DESCRIPTION OF THE PREFERRED EMBODIMENTS

While the present invention can be advantageously employed in various kinds of lamp components and assemblies that are suited by virtue of their small physical size and high brightness for residential and office lighting purposes, it is particularly adapted for use in conjunction with lamp units that employ low-pressure type discharge lamps (such as fluorescent lamps) to generate the light with optimum efficiency and are fitted with base components which permit the units to be operated in table lamps and other types of lighting fixtures and it has, accordingly, been so illustrated and will be so described.

Figure 1:
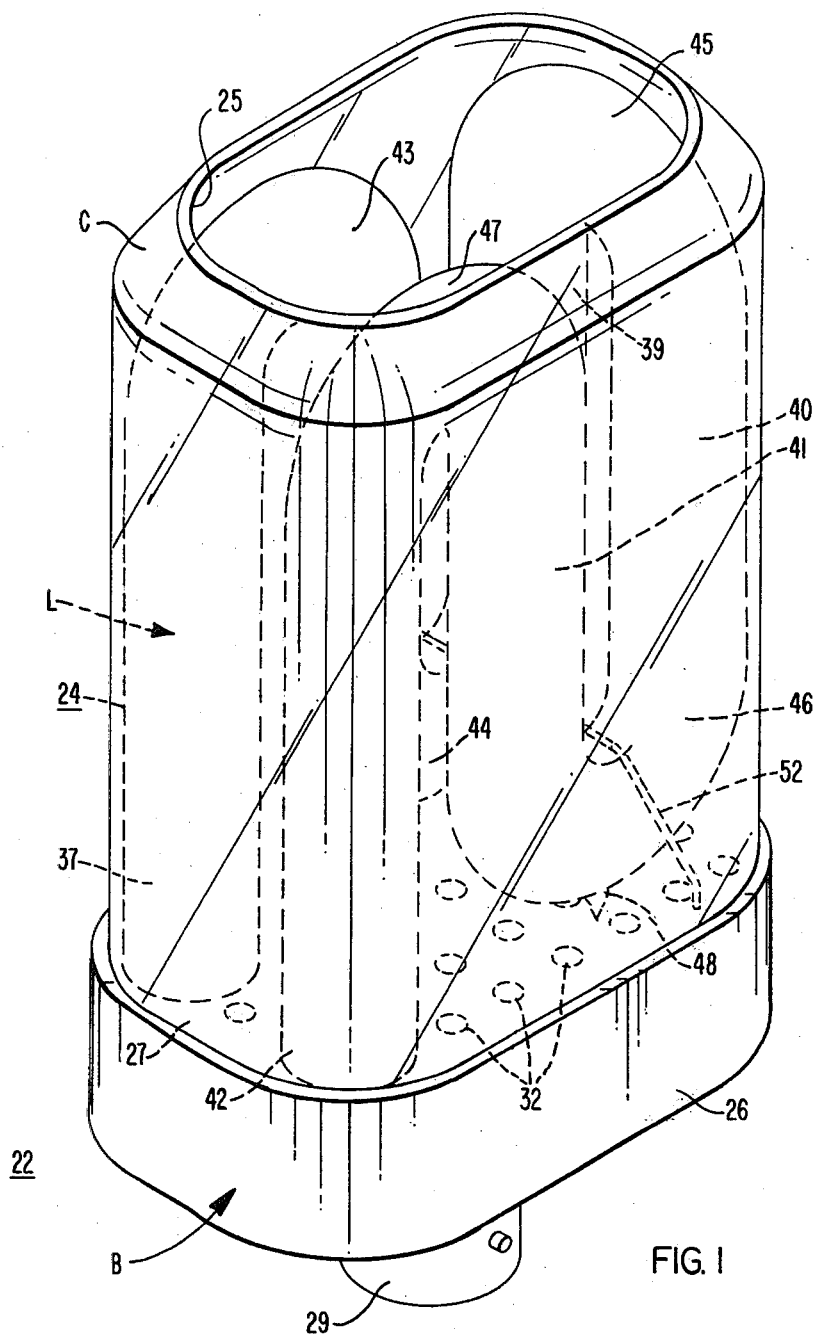
FIG. 1 is a perspective view of a compact fluorescent lamp unit that embodies the invention, the convoluted lamp component (five U-bent segments) and its support lamp means being depicted in phantom outline to show their location within the unit.
Figure 2:
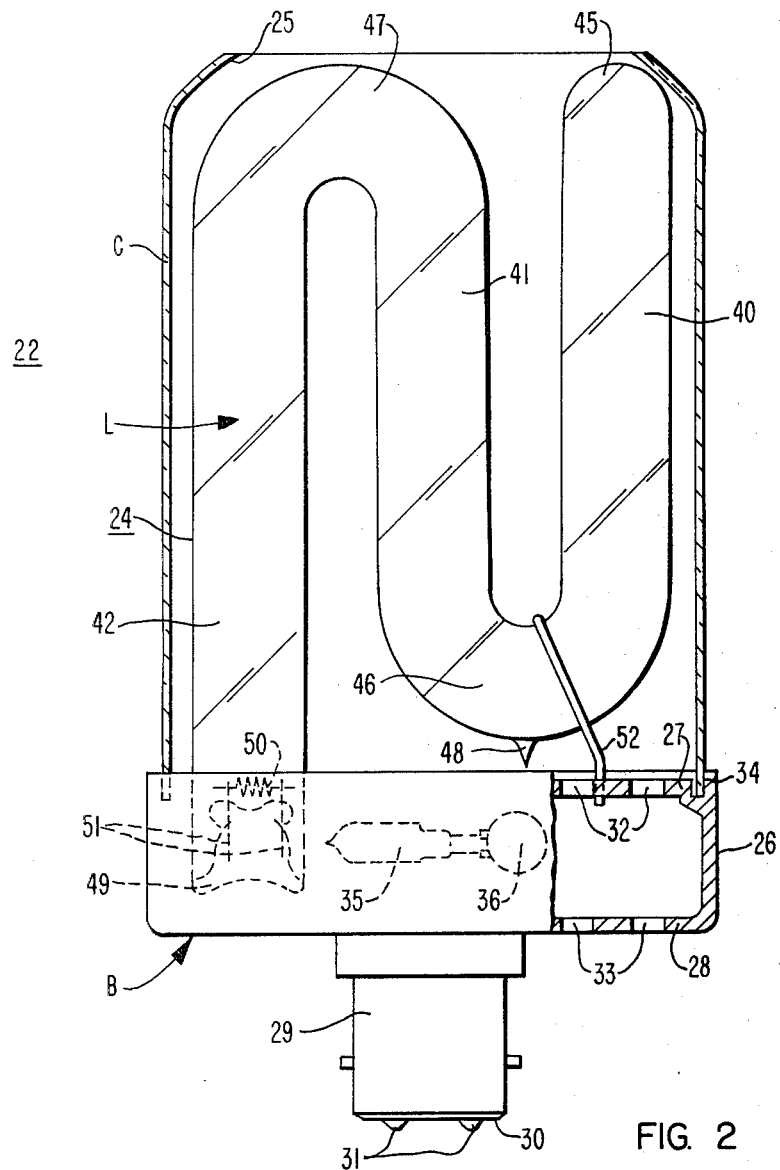
FIG. 2 is a side elevational view, partly in section, of the lamp unit shown in FIG. 1.

A compact fluorescent lamp unit 22 embodying the invention is shown in FIGS. 1 and 2 and consists of three basic parts—namely, a fluorescent lamp L, a base structure B, and a light-transmitting housing or cover C. As will be noted, the lamp L is of single-ended construction and has a tubular envelope 24 of convoluted configuration which provides a concentrated tridimensional light source of high efficacy and brightness (as hereinafter explained). The cover C has a top opening 25 and protectively encloses the lamp. The base structure B holds the lamp L in assembled relationship with the cover C and has a generally rectangular-shaped cup portion 26 that accommodates and is coupled to the sealed ends of the lamp envelope 24. It also has an inner wall 27 that extends transversely across the top of the base structure and serves as a panel-support member which retains the lamp L in its upright position.

As will be noted more particularly in FIG. 2, the base structure B also has a bottom panel or wall 28 and is terminated by a suitable electrical connector component, preferably a bayonet-type base member 29 which includes the usual insulator 30 and end contacts 31. The walls 27 and 28 of the base structure B are provided with a series of spaced apertures 32, 33 which permit air to enter the lamp unit 22 and pass through the opening 25 at the top of the cover C. The "chimney effect" produced by the heat generated by the fluorescent lamp L (when the lamp unit 22 is energized) causes air to circulate freely through the unit and convection cool the lamp, thus avoiding excessive operating temperatures and the resultant drop in light output that might occur due to the power loading of the lamp and its compact size.

The cup-shaped portion 26 of the base structure B can be molded from suitable temperature-resistant plastic to provide a one-piece member that is fastened to the metal shell portion of the bayonet base 29. The rim of the protective cover C is seated in a groove 34 (shown in FIG. 2) that is provided along the inner periphery of the cup-shaped portion 26 and, in accordance with this embodiment, the chamber which is defined by this part of the base structure B contains a conventional starter component 35 and condenser 36 that are connected to the fluorescent lamp L and to a separate ballast component (not shown) in the usual fashion to permit the lamp to be started and operated from an AC power supply.

As illustrated in FIGS. 1 and 2 (and more particularly in FIG. 13, which is a pictorial illustration of the lamp envelope as a separate component), the envelope 24 of the fluorescent lamp L comprises a vitreous tube that is bent upon itself in such a manner that it has six substantially straight leg segments 37, 38, 39, 40, 41 and 42 that extend in the same direction and are joined by five U-bent segments 43, 44, 45, 46 and 47. The U-bent segments are of such curvature and so oriented that the tubular legs are disposed in columnar array and spaced from one another. The leg segments and U-bent segments accordingly form five conjoined U-shaped envelope sections that are located in three different planes and define a single discharge channel of serpentine configuration that is terminated by the leg segments 37 and 42. As will be noted in FIG. 13, U-bent sections 43 and 47 are aligned with one another, extend in the same direction and merge with U-bent sections 44 and 46 which are also aligned with one another and extend in the opposite direction. The ends of sections 44, 46 are joined by the fifth U-bent section 45 which is located opposite and in transverse relationship with sections 43 and 47. The six straight tubular legs of the envelope 24 are thus disposed in two rows with three legs in each row and, together with the U-bends, form two generally S-shaped sections. The convoluted fluorescent lamp L thus constitutes a compact light source that is rectangular in cross section.

As shown in FIGS. 1 and 2, U-bent segment 46 has a tipped-off remnant 48 of a glass tubulation that is sealed to the envelope 24 after it is bent into its convoluted form. This tubulation is used to obtain phosphor paint from the retrobent envelope during the phosphor-coating operation and thus ensure that the U-bent sections are coated with a uniform layer of phosphor material. Another tipped-off phosphor-draining tubulation (not shown) can be provided on the other downwardly-extending U-bent section 44. Since the compact fluorescent lamp L operates at a rather high power loading to attain the desired high brightness, the aforementioned tipped-off tubulations afford an additional advantage in the finished lamp since they provide cavities inside the envelope 24 that serve as desirable "cool spots" and reservoirs for condensed mercury which regulate the mercury vapor pressure during lamp operation.

The leg segments 37 and 42 that terminate the envelope 24 and the discharge channel are hermetically sealed by conventional stem components which include the usual tungsten-coil electrodes that are coated with suitable electron-emission material and are connected to suitable conductors, such as paired lead-in wires, that extend through the respective stems and beyond the sealed ends of the envelope. The stem 49 which seals off leg segment 42 and includes the associated electrode 50 and lead-in wires 51 are shown in FIG. 2. Each of the stems has a sealed-off exhaust tubulation (not shown) which permits the convoluted envelope 24 to be evacuated and then charged with a suitable fill gas and dosed with mercury in accordance with standard lamp-making practice. If desired, non-tubulated type stems can be used and the evacuation, gas-filling and mercury-dosing operations can be done through the phosphor-draining tubulations which are fused to and extend from the U-bent segments 44 and 46.

As will also be apparent to those skilled in the art, a straight tubular envelope can be coated with phosphor paint, lehred, and then provided with stem assemblies to form a partly fabricated fluorescent lamp of conventional shape which can then be bent or folded upon itself into the desired multiple-U-bent configuration. The resulting convoluted embryonic discharge lamp can subsequently be completed by exhausting, gas-filling, and mercury-dosing it through the tubulation which is provided on one or both of the stems. With this mode of lamp manufacture, there would be no tipped-off tubulations on any of the U-bent segments of the envelope 24.

As will be noted in FIGS. 1 and 2, the sealed ends of the terminating leg segments 37, 42 of the convoluted fluorescent lamp L are located within the chamber defined by the cup-shaped portion 26 of the base structure B and are secured in a suitable manner to the top wall 27 of base structure so that hold the lamp is held in upstanding position within the protective cover C. Additional support means such as a wire brace 52 can be provided, if desired, to hold the lamp L in place. As shown, the brace 52 is anchored to the wall 27 of the base structure B and extends around and snugly grips the adjacent U-bent segments 44 and 46 of the envelope 24.

The protective cover C can be made of glass, heat-resistant plastic or other suitable transparent or translucent material that will not absorb the light rays generated by the fluorescent lamp L. If transparent material is used, it may be made translucent by a suitable white light-diffusing coating, or other means (such as frosting) to reduce glare from the bright surface of the retrobent lamp L and thus provide a more uniform and pleasing lighted appearance.

The starter component 35 is of the conventional "glow lamp" type and is permanently wired in place and connected in the usual manner with the lamp electrodes. However, the starter could be made in the form of a fuse-like component that is mounted within the base structure B in such a manner that it may be readily removed and replaced as necessary by a "twist-lock" action. The condenser 36 is of the miniature wafer type and is connected in the lamp circuit in such a fashion that it eliminates or minimizes radio interference during lamp starting.

Since the tubular leg segments 37, 38, 39, 40, 41 and 42 of the convoluted envelope 24 extend in the same direction and are disposed substantially parallel to one another in two rows or planes (three leg segments per row), the overall configuration of the fluorescent lamp L is such that it is generally rectangular in character. When the lamp is energized, it thus constitutes a three-dimensional source of light which, while very compact, still has a single discharge channel that is more than six times as long as the overall height of the envelope 24 and thus permits the lamp to be operated efficiently by voltage and current inputs with an operating circuit that is compatible with the electrical power supplied to homes and office buildings.

While the convoluted lamp envelope 24 can be made by joining five separate U-bent sections of vitreous tubing together, it is preferably formed from a single piece of "soft" lead glass tubing of the kind used for conventional fluorescent lamp bulbs. The glass tubing is bent at the proper locations to form the U-bends and is subsequently coated with phosphor and provided with stem assemblies, evacuated, gas-filled, etc. in the usual manner. As suitable fill gas is argon at a pressure below about 10 torr, and preferably about 3 torr. The mercury dosage will vary according to the physical size of the lamp and the power loading at which it is operated but is sufficient to provide mercury vapor at a partial pressure of from about 6 to 10 millitorrs, when the lamp is operated at its rated wattage, and maintain the mercury vapor pressure at this level within the lamp during its useful life.

While any suitable phosphor (or mixture of phosphors) can be used to form the luminescent coating on the inner surface of the convoluted tubular envelope 24, in lighting applications where optimum visual clarity and color rendition of the illuminated objects or area are required or desired, phosphor coatings which contain a blend of three phosphors that emit visible radiations in three different selected regions of the spectrum (specifically, the wavelength regions of about 450 nm, 540 nm and 610 nm) are desirably employed to provide a so-called "prime color" fluorescent lamp, pursuant to the teachings of W. A. Thornton in the article entitled, "Luminosity and Color-Rendering Capability of White Light", *Journal of the Optical Society of America*, Vol. 61, No. 9 (September 1971), pages 1155–1163. As a specific example, a suitable phosphor blend for the multiple-U-bent fluorescent lamp L of the present invention which provides such an enhanced light output contains manganese-activated zinc silicate phosphor, europium-activated strontium chlorophosphate phosphor, and europium-activated yttrium oxide phosphor—all of which are well known to those skilled in the art.

Alternatively, the envelope 24 can be coated with "Cool White" or "Warm White" halophosphate type phosphors (or any other kind of phosphor or phosphor mixtures) that are well known and commonly employed in conventional type fluorescent lamps.

ALTERNATIVE COMPACT LAMP UNIT EMBODIMENT (FIGS. 3-4)

The invention is not limited to compact fluorescent lamp units of the type just described which requires a separate ballast component but includes within its scope lamp units having a "built-in" ballast and circuitry that permit the unit to be operated directly from a power source and thus be employed as direct substitute for incandescent type lamps in various kinds of lighting fixtures.

Figure 4:
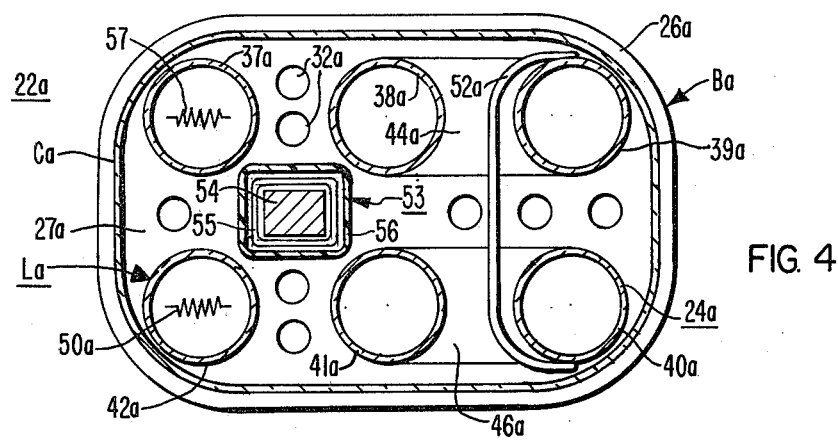
FIG. 4 is a cross-sectional view through the alternative lamp unit, along line IV—IV of FIG. 3.
Figure 3:
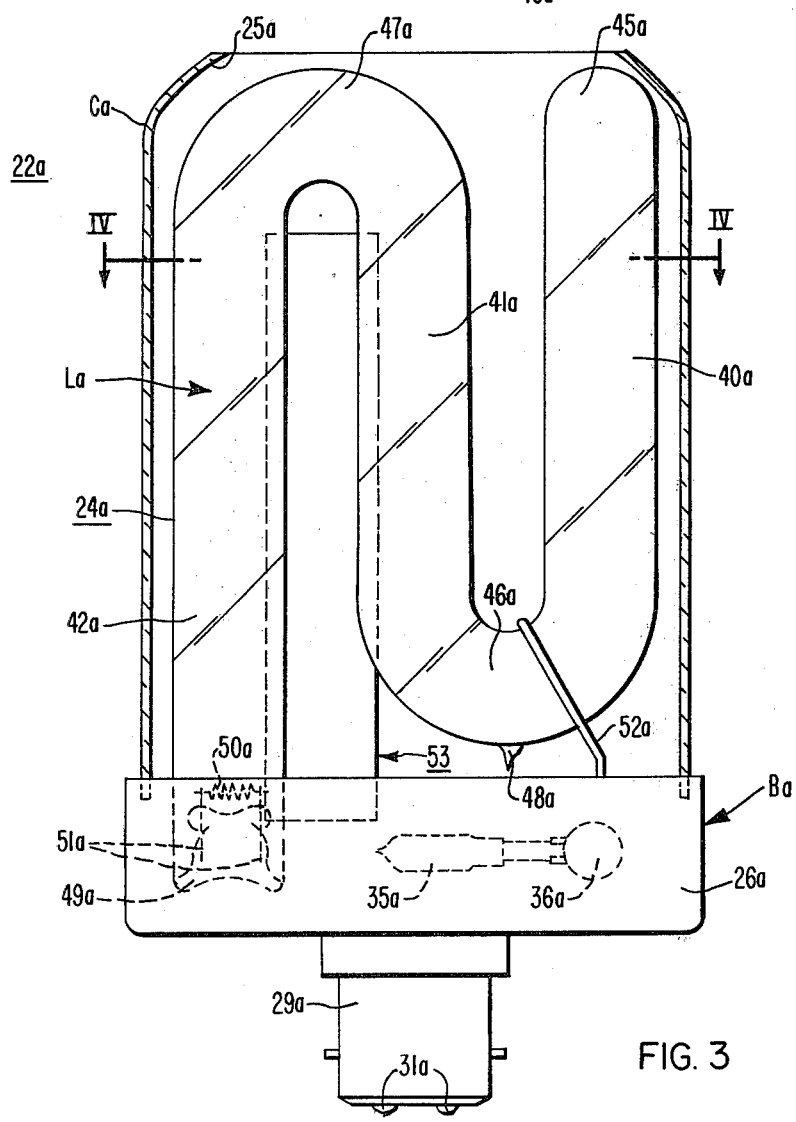
FIG. 3 is a side elevational view of an alternative fluorescent lamp unit according to the invention wherein an elongated ballast component is disposed in nested relationship with the U-shaped sections of the retrobent envelope.

Such a "self-contained" fluorescent lamp unit 22a is shown in FIGS. 3 and 4 and consists of the same basic components—namely, a compact fluorescent lamp La having a convoluted envelope 24a that is formed by five conjoined U-bent sections and is supported in upstanding position by a vented base structure Ba in protectively enclosed relationship with a cover Ca that is secured to the cup-shaped portion 26a of the base structure and has a top opening 25a for lamp-cooling purposes. In accordance with this embodiment, an elongated ballast component 53 is located in the space between the upstanding leg segments 37a, 38a, 41a and 42a which comprise two of the U-bent sections of the envelope 24a that are aligned with one another. The ballast component 53 is secured to the apertured support wall 27a of the cup-shaped portion 26a of the base structure Ba and extends longitudinally in nested but spaced relationship with the aforementioned leg segments of the envelope.

As shown in FIG. 4, the ballast component 53 desirably comprises a so-called "finger" type choke ballast that has an iron core 54 which is overwound with insulated wire 55 and is encased in a sheath 56 of suitable insulating material such as heat-resistant tape or plastic that is white or light-colored to minimize light-absorption losses.

The ballast 53 is connected by suitable conductors (not shown) in series with the lamp electrodes. The starter 35a and condenser 36a are also connected to the electrodes by conductors (not shown) in the usual manner to start the fluorescent lamp La in preheat fashion when the lamp unit 22a is connected to an alternating-current power supply through the bayonet base 29a and its contacts 31a.

In all other respects, lamp unit 22a and its retrobent fluorescent lamp component 24a are of the same construction as those shown in FIGS. 1 and 2 and previously described.

ALTERNATIVE COMPACT LAMP UNIT EMBODIMENT (FIGS. 5-6)

Figure 5:
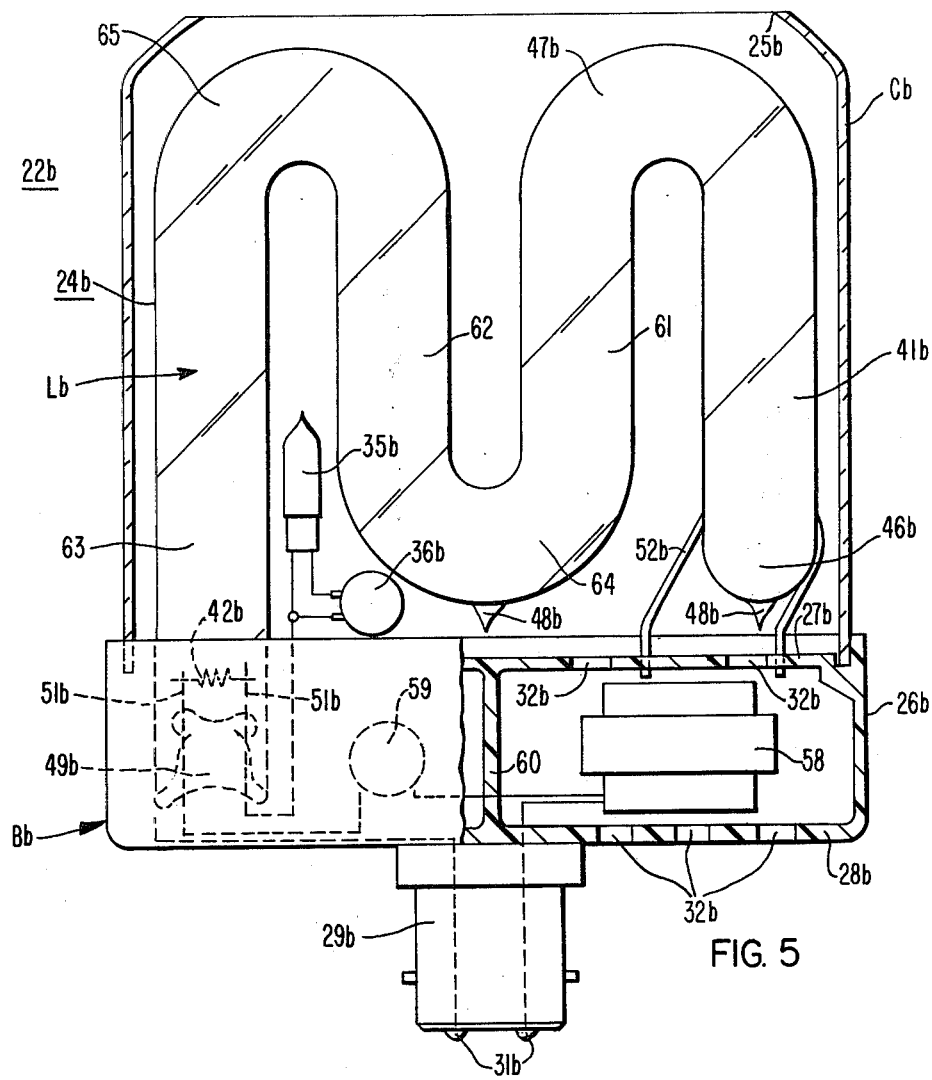
FIG. 5 is a side elevational view, partly in section, of another alternative embodiment of a compact fluorescent lamp unit according to the invention.
Figure 6:
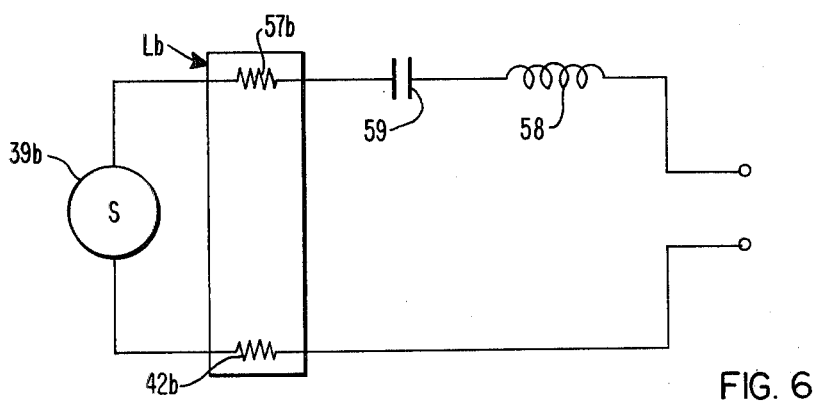
FIG. 6 is a schematic of an L/C type starting and operating circuit for the fluorescent lamp units of the invention.

Another "self-contained" type lamp unit 22b having a convoluted fluorescent lamp Lb of different configuration and an inductor-capacitor type ballast that is housed within the base structure Bb is illustrated in FIGS. 5-6 and will now be described.

As will be noted in FIG. 5, the lamp unit 22b is of the same basic type as those previously described in that it consists of a compact discharge lamp Lb that has a retrobent envelope 24b which is disposed within a vented protective cover Cb and held in operative relationship therewith by a base structure Bb which has a cup-shaped portion 26b and is terminated by a bayonet-type base 29b having a pair of end contacts 31b. In accordance with this embodiment, the ballast means comprises an inductor 58 and a capacitor 59 that are connected in series and are located in separate compartments or chambers formed within the base structure Bb by a partition 60 that constitutes part of the cup-shaped portion 26b, pursuant to the teachings of the invention disclosed and claimed in the afore-mentioned concurrently-filed application Ser. No. 97,278 of E. W. Morton. The partitioned base structure Bb has a pair of support panels 27b and 28b that are provided with vent apertures 32b, 33b which permit air to circulate freely through the composite base and lamp unit 22b and thus provide convection cooling of the enclosed inductor 58 and capacitor 59 as well as the lamp Lb during operation.

As shown in FIG. 6, the inductor 58 is connected in series with the capacitor 59 and one of the lamp electrodes 57b, and the latter is connected to the other electrode 42b through the starter component 36b. As disclosed in the aforementioned concurrently-filed application Ser. No. 97,278, the electrical values of the choke or inductor 58 and capacitor 59 are such that the reactance of the capacitor at the frequency of the AC power supply conventionally used in homes is slightly greater than the reactance of the inductor and thus causes the ballast to operate as a so-called "lead-type" circuit. This generates a voltage across the lamp Lb which is greater than the input or supply voltage and thus reliably starts the lamp despite its long arc length. This type of ballast arrangement is very compact in size, light in weight and has excellent operating efficiency and is thus well suited for use in the compact fluorescent lamp units of the present invention where such characteristics are of prime importance.

As will be noted in FIG. 5, the starter component 35b and its connected noise-suppressing capacitor 36b can be located within the convolutions of the retrobent lamp envelope 24b or, if desired, they can also be housed within the partitioned base structure Bb along with the ballast components. As in the previously-described embodiments, auxiliary support means for the retrobent lamp Lb is provided by a brace 52b that is anchored to the support wall 27b of the base structure and engages the adjacent U-bent sections 46b of the envelope 24b.

In contrast to the previous embodiments, the convoluted fluorescent lamp Lb has an envelope 24b that is of different configuration and has an additional U-shaped section which provides a discharge channel that is of greater length and thus further increases the light output of the lamp. As shown more clearly in FIG. 17 (which is an isometric view of the lamp envelope 24b immediately after it has been formed and before it is sealed), the convoluted envelope 24b has eight straight tubular leg segments 37b, 38b, 39b, 40b, 41b, 61, 62 and 63 that are disposed in two rows that each contain four of the leg segments and are joined by seven U-shaped segments 43b, 44b, 45b, 46b, 47b, 64 and 65. Envelope 24b thus has two additional tubular leg segments and two additional U-bends compared to the previous envelope embodiments 24 and 24a, and three of its U-bent segments are conjoined to form a generally M-shaped section that is aligned with and spaced from another generally M-shaped section of the envelope which is formed by the second set of three conjoined U-shaped segments. Each of the aforesaid generally M-shaped sections of the envelope are disposed in spaced parallel planes and joined by the seventh U-shaped segment 46b which constitutes the medial portion of the vitreous tube from which the envelope 24b was formed. The tubular leg segments 37b and 63 which terminate the envelope (and the single discharge channel which is defined by the seven conjoined U-shaped segments) are disposed adjacent one another in a common plane that is spaced from and parallel to the plane which contains the U-shaped segment defined by U-bend 46b and the tubular legs 40b and 41b.

As will be noted in FIG. 5, the downwardly extending U-bent segments 44b (not shown), 46b and 64 of the lamp envelope 24b are provided with protruding tips 48b of sealed-off vitreous tubulations in order to facilitate the phosphor-coating of the convoluted envelope and also provide "cool-spots" for mercury-vapor regulation within the operating lamp, as described previously.

ALTERNATIVE COMPACT LAMP UNIT EMBODIMENT (FIG. 7)

Figure 7:
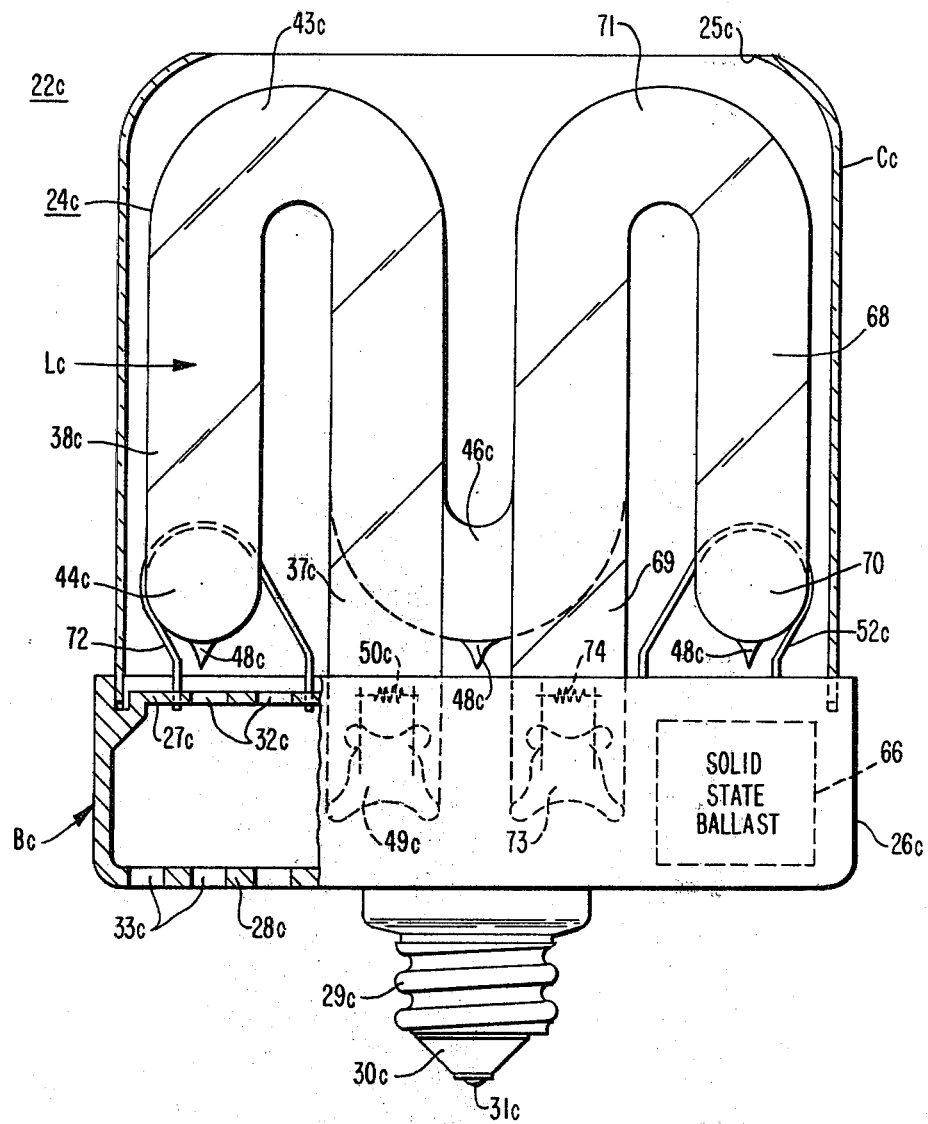
FIG. 7 is a side elevational view, partly in section, of another compact lamp unit which embodies the invention and includes a retrobent fluorescent lamp that has seven conjoined U-shaped segments.

Another type of compact lamp unit 22c which contains a fluorescent lamp Lc having a convoluted envelope 24c formed by seven conjoined U-shaped sections is shown in FIG. 7. As will be noted, this lamp also consists of three basic parts or components as in the previous embodiments—namely, a retrobent fluorescent lamp Lc, a light-diffusing protective cover Cc and a base structure Bc that holds the cover and lamp in operative spaced-apart relationship. The base structure Bc has a cup-shaped portion 26c that has support panels 27c and 28c that are provided with vent apertures 32c and 33c which, together with the top opening 25c in the cover, permit air to circulate through the lamp unit 22c and convection cool the fluorescent lamp Lc and base structure.

In contrast to the previous embodiments, the base structure Bc is terminated by a screw-type base member 29c having a conical-shaped insulator 30c and a single end contact 31c, thus permitting the lamp unit 22c to be screwed into a suitable socket rather than twist-locked therein as in the case of the bayonet-type bases used on the previous lamp unit embodiments. In addition, the starting and operation of the fluorescent lamp Lc from an alternating-current power supply is achieved by means of a solid-state type ballast and circuit using well-known miniature components and circuit boards to provide a small component 66 that is located within the chamber defined by the cup-shaped portion 26c of the base structure Bc.

The convoluted envelope 24c of the fluorescent lamp component Lc is also of different configuration. As shown more clearly in FIG. 21 (which is a perspective view of the lamp envelope immediately after it has been formed from a single piece of straight tubing), it includes eight substantially straight tubular leg segments 37c, 38c, 39c, 40c, 41c, 67, 68 and 69 that are joined by seven U-bends 43c, 44c, 45c, 46c, 47c, 70 and 71. As will be noted, three of the resulting U-shaped sections are disposed in a common plane and form a generally M-shaped portion which is terminated at each end by the adjoining U-shaped segments that are are formed by the legs 38c, 39c and U-bend 44c and legs 67, 68 and U-bend 70 and are disposed in planes that are normal to the aforementioned common plane. The tubular leg segments 37c and 69 are located adjacent one another in a plane that is spaced from and parallel to the aforesaid common plane and which also contains U-bends 43c and 71 and their conjoined tubular legs 38c and 68, respectively. The terminating legs 37c and 69 are thus located opposite U-bend 46c which constitutes the medial portion of the retrobent tubular envelope 24c.

Returning to FIG. 7, each of the U-bends 44c, 46c and 70 which are located at the bottom of the convoluted envelope 24c (when the lamp unit 22c is oriented in a base-down position) are provided with sealed-off tips 48c of tubulations that are used for phosphor coating purposes during lamp manufacture. The outwardly disposed U-shaped sections 44c, 70 are also anchored to the support panel 27c of the base structure Bc by a pair of metal clips or braces 52c and 72 that are fastened to the support panel and loop around and are coupled to the associated U-shaped segments. As in the previous embodiments, the terminating leg portions 37c and 69 are sealed by stems 49c and 73 having the usual pairs of lead-in wires that connect the electrodes 50c and 74 with the components of the solid-state ballast and starting circuit component 66.

The tridimensional light source formed by the compact convoluted fluorescent lamp Lc is accordingly of the same rectangular cross-sectional configuration and has the same overall dimensions as the previous seven-U-bent lamp embodiment Lb except that the terminating legs 37c and 69 are disposed at one side and centrally of the envelope rather than at one end thereof.

SPECIFIC EXAMPLES

A better appreciation of the compactness and advantageous energy-conserving and light-output characteristics of the fluorescent lamp units provided by the present invention will be obtained from the following specific examples of various prototype lamps that have been made and tested.

The first prototype fluorescent lamp was formed by bending a piece of glass tubing approximately 71 cms. long and 20 mm in diameter (outside) into a so-called "three fold" convoluted envelope having six straight leg segments conjoined by five U-bent segments. The envelope had the configuration shown in FIGS. 1, 2 and 13 and its width dimensions were 5.2 cms. by 8.2 cms. and its overall height was approximately 14 cms. The envelope was provided with conventional stems and electrodes, mercury-dosed, etc. after being coated with the aforementioned blend of "prime color" phosphors. When operated at a current of 350 milliamps from a reactor-ballasted AC power supply the operating voltage of the finished lamp was 102 volts (power consumption of 29.5 watts) and it had an initial (0 hour) light output of 1780 lumens (approximately 60 LPW).

In contrast, a "two fold" or triple-U-bent fluorescent lamp having a convoluted envelope formed from a piece of tubing approximately 48 cms. long and 20 mm. diameter but having only four straight leg segments joined by three U-bent segments (pursuant to the teachings of the aforementioned copending application Ser. No. 11,836 of F. W. Hoeh) had overall measurements of 5.2 cms. by 5.7 cms. In width, 12.7 cms. in height and had an initial light output of 1056 lumens when coated with the same phosphor "prime color" blend and operated at a power loading of 18.8 watts (350 milliamps at 64.3 volts). The lamp thus had an efficacy of about 56 lumens per watt. An indentical triple-U-bent lamp coated with a "white" halophosphate type phosphor (calcium chlorofluorophosphate) had a light output of 1152 lumens and an efficacy of 59.7 lumens per watt when operated at 350 milliamperes 65.5 volts (approximately 19 watts).

Figure 17:
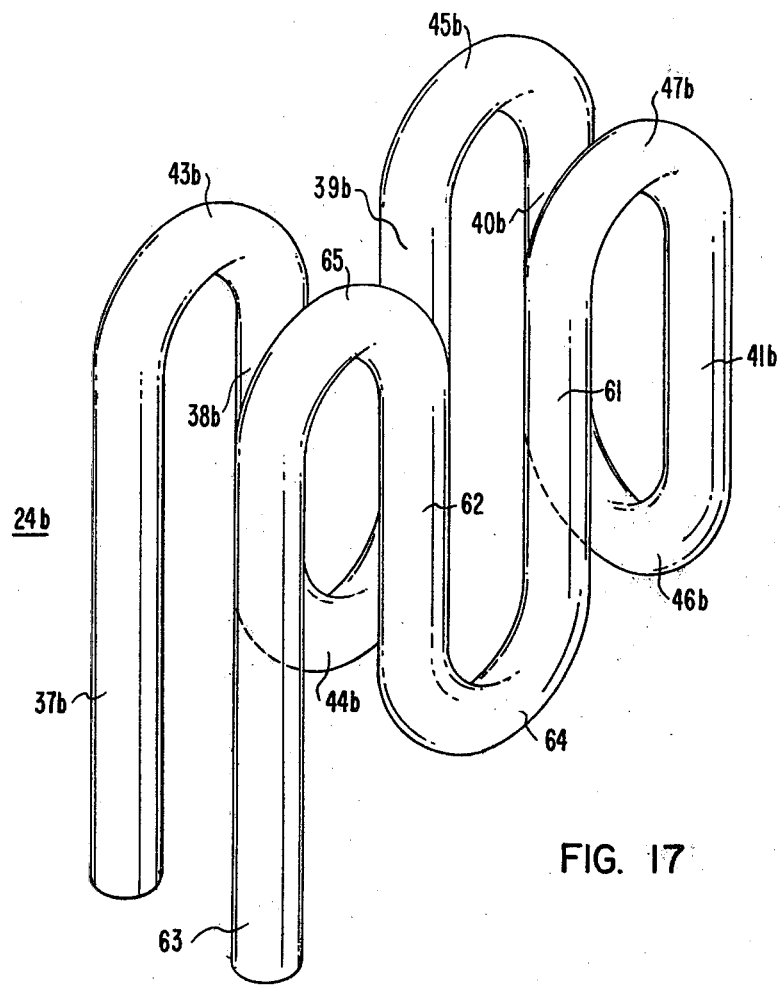
FIG 17 is an isometric view of the seven-U-bent type envelope produced by the bending operations shown in FIGS. 14-16.

A prototype fluorescent lamp of the "four-fold" construction shown in FIGS. 5 and 17 (eight tubular leg segments and seven U-shaped segments) had an initial light output of 2320 lumens (69.7 lumens per watt) when operated at 350 miliamperes and 119 volts (power loading of 33.3 watts). The overall dimensions of this lamp were 5.1 cms. by 11.2 cms. wide, 12.6 cms. in height and the tubing from which it was formed was approximately 86 cms. long, had an outside diameter of 20 mm. and was coated with a blend of calcium "yellow" halophosphate phosphor (calcium fluorophosphate) and europium-activated yttrium oxide phosphor. When this lamp was operated at 430 milliamperes and 111 volts (power loading of 38.9 watts) it had an output of 2635 lumens (67.7 lumens per watt).

The present invention accordingly provides a family of compact multi-U-bent fluorescent lamps and lamp units that are small enough to fit into various kinds of residential and office lighting fixtures and have light outputs of at least 1500 lumens and lamp efficacies in the order of 60 lumens per watt.

LIGHTING FIXTURE INSTALLATION (FIGS. 8–9)

Figure 8:
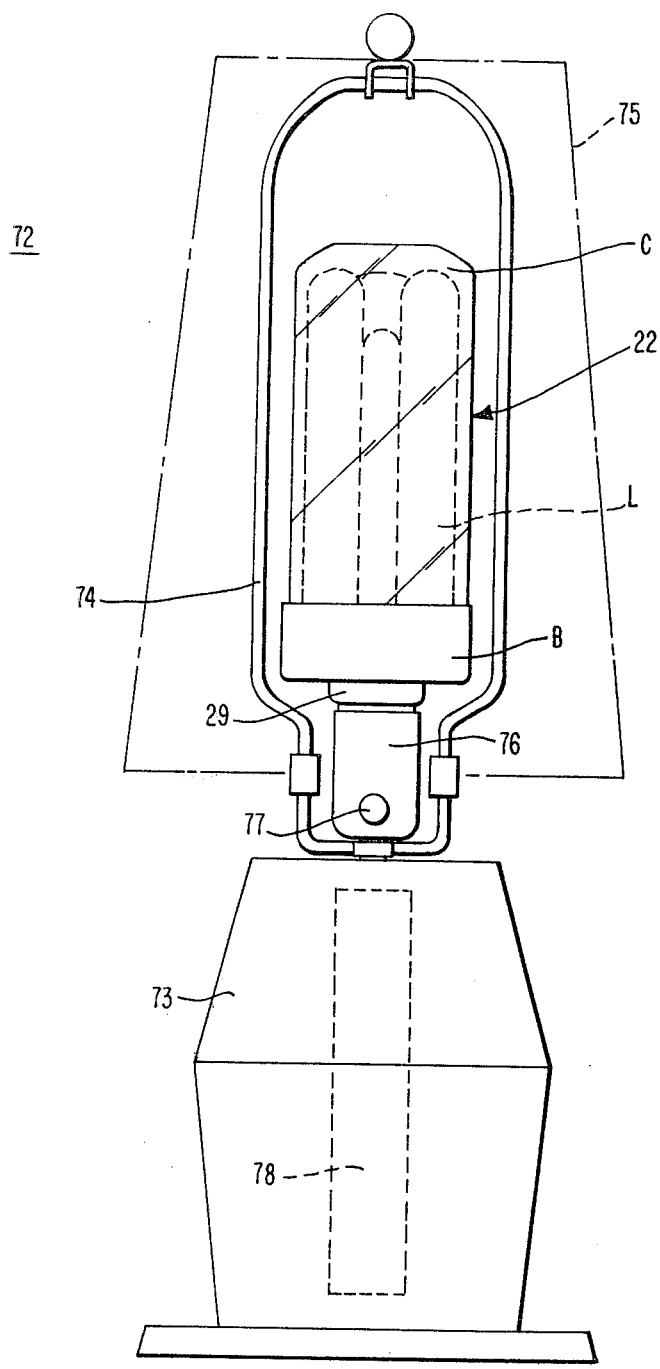
FIGS. 8 and 9 are front and side elevational views, respectively, of a table lamp fixture that is fitted with a compact fluorescent lamp unit of the present invention and includes a ballast component which is housed within the bottom or base of the lamp fixture.
Figure 9:
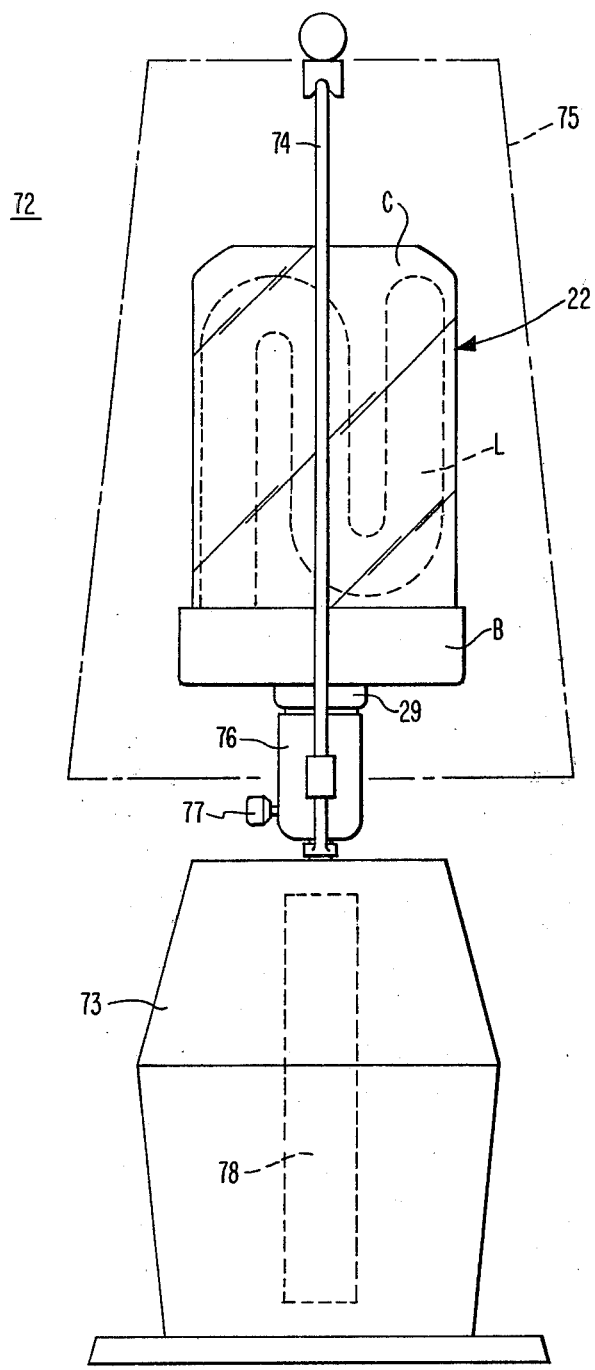

The manner in which the compact fluorescent lamp units of the present invention permit various lighting fixtures and apparatus to be readily converted to take advantage of the energy-conservation characteristics of the improved units is illustrated in FIGS. 8 and 9.

As will be noted, the lighting fixture or apparatus comprises a typical table lamp 72 having a base or support housing 73 and an attached upstanding metal harness or so-called harp member 74 of conventional shape and dimensions that holds the lamp shade 75 in suspended position. A bayonet-type socket 76 having switch means 77 is secured to housing 73 within the bottom portion of the harp member 74 and is coupled to the bayonet base portion 29 of a fluorescent lamp unit 22 (of the type shown in FIGS. 1 and 2, for example) which comprises a retrobent fluorescent lamp L (three-fold seven-U-bend type), a protective light-diffuser cover C and a base structure B. A suitable "step-up" transformer and ballast component 78 mounted within the base housing 73 of the lamp fixture 72 energizes the lamp unit 22 when the power cord of the fixture is plugged into a power outlet. As shown in FIGS. 8 and 9, the overall width and height dimensions of the compact lamp unit 22 are such that it readily fits within the harp member 74 of the table lamp 72 and provides adequate clearance relative to the top of the harp and the lamp shade 75. Such harp members typically have an opening that measures 10 cms. by 22 cms.

The use of bayonet-type base and socket components permits the lamp unit 22 to be slipped into the harp 74 and then be inserted into and twist-locked with the fixture socket even though the major width dimension of the lamp unit 22 prevents the lamp unit from being rotated a full turn without striking the harp.

MANUFACTURE OF "THREE-FOLD" TYPE LAMP ENVELOPE (FIGS. 10–13)

A method of forming a "three-fold" envelope for a compact fluorescent lamp of the type shown in FIGS. 1 and 2 (six legs segments and five U-bent segments) from a straight piece of glass tubing by a sequence of bending operations which can be performed by suitably designed automated equipment shown in FIGS. 10–13.

Figure 10:
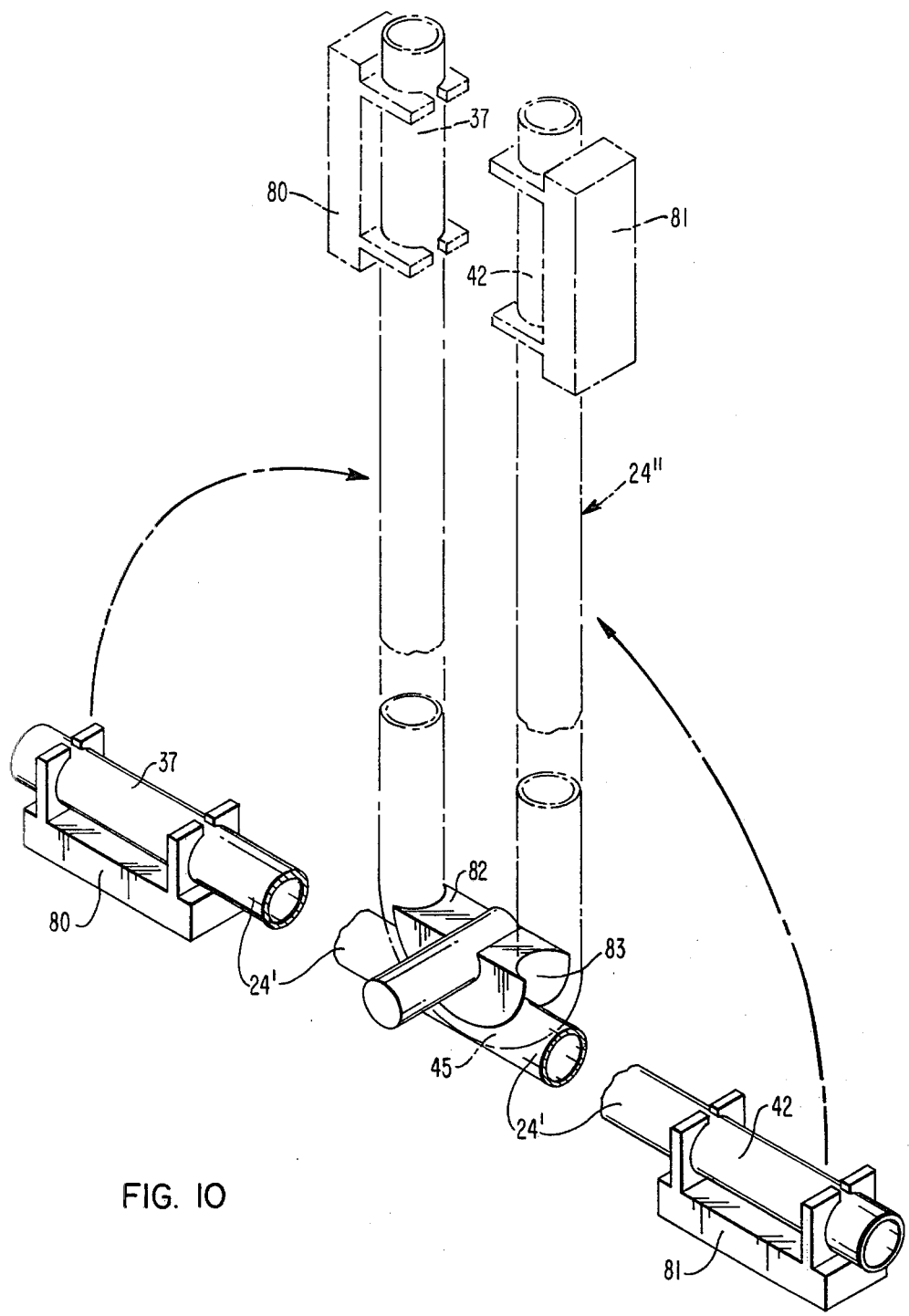
FIGS. 10-12 are simplified pictorial views of the various steps in forming a straight piece of vitreous tubing into a retrobent lamp envelope of the present invention that has five U-shaped segments.

The first tube-bending operation is shown in FIG. 10 and consists of placing a straight piece 24' of suitable glass tubing of predetermined length in a pair of holders 80, 81 which grip the ends of the tubing and are swingable toward one another along arcuate paths (indicated by the arrows) in a plane that is substantially aligned with the tubing axis. As a specific example, soda-lime glass tubing of the type conventionally used in the manufacture of fluorescent lamps can be employed. Such glasses are well known in the art and typically have a softening point in the order of 693° C., an annealing point of about 515° C., and a strain point of around 470° C.

After the glass tubing 24' is placed in the holders 80 and 81, the medial portion of the tubing extending between the holders is heated by gas fires (or other suitable means) to a uniform temperature which softens the glass sufficiently to permit the tubing to be bent without fracturing or collapsing. A temperature of around 780° C. is suitable in the case of the aforementioned soda-lime type glasses. The center of the tubing 24' is then placed against the arcuate work surface of a preheated mold component 82, which surface is contoured to define a peripheral groove 83 that nestingly accommodates and effects a mechanical interlock with the tubing. While the glass is in its heat-softened condition, holders 80 and 81 are each rapidly swung through an arc of approximately 90°, in the manner indicated by the arrows, thus bending the central part of the heated tubing 24' around the mold 82 and forming a U-bend 45. This transforms the straight tubing 24' into a U-shaped tubular component 24" which has long leg sections that are substantially parallel to one another and of the same length. As indicated by the reference numerals, the rigid end segments 37 and 42 of the tubing 24' that are gripped by the holders 80 and 81 constitute the corresponding straight tubular segments which will terminate the finished retrobent envelope.

Figure 11:
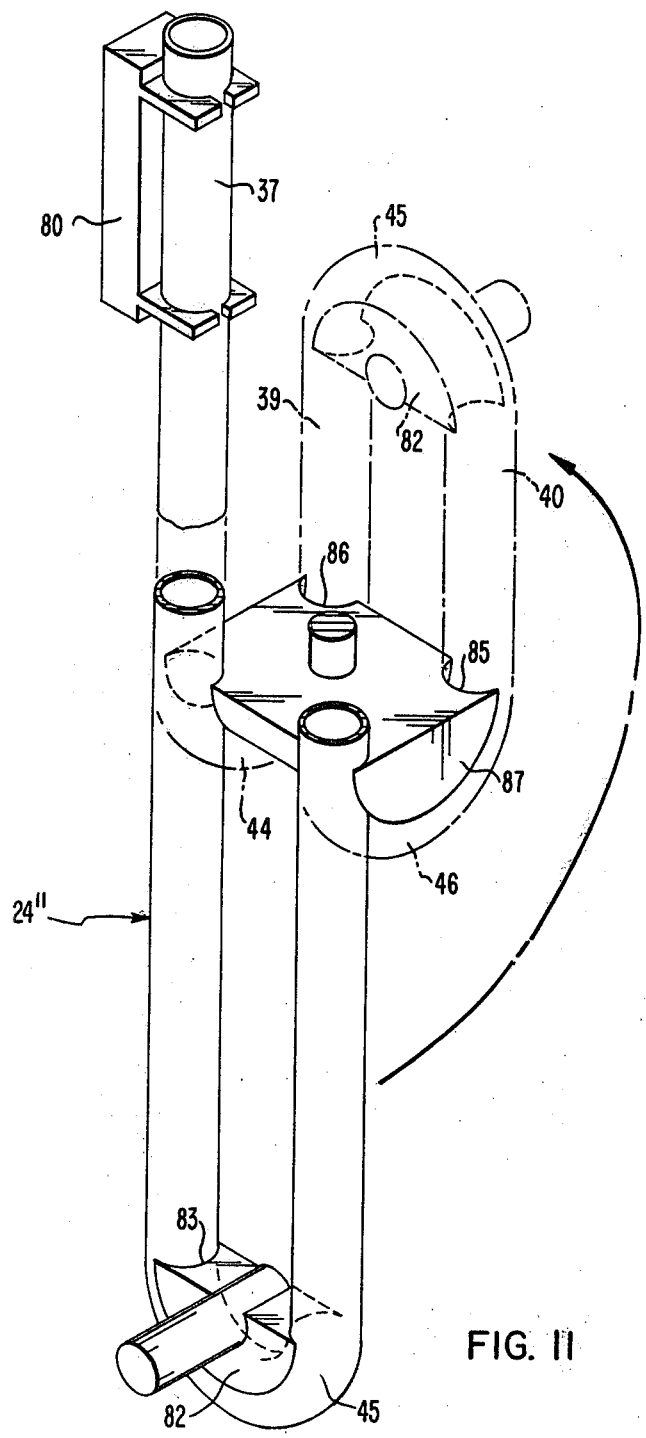

The second bending operation is depicted in FIG. 11 and is begun immediately after the first bending operation has been completed while the glass tubing is still in its heat-softened and plastic condition. As shown, the legs of the U-shaped tube 24" are seated against the groove-shaped work surfaces 85, 86 of another preheated arcuate mold component 87 that is moved into bridging position with both legs of tube 24" after the first bending operation has been completed. With the holders 80 and 81 held stationary (along with the associated tube ends 37 and 42), mold component 82 and the U-bent end 45 of the tubing 24" that is seated therein are swung through an arc of approximately 180° (indicated by the arrow) along a plane that is substantially normal to the plane of the first bending operation, thereby effecting the second bending operation. As shown, the bending action is such that selected medial portions of both legs of the U-shaped tube 24" are wrapped around the grooved portions 85, 86 of the second mold 87 and are formed into two additional U-bent segments 44 and 46 that are spaced from each other and disposed in substantially parallel-paired relationship. The mechanical interlock with tube 24" effected by the grooved work surface 83 of mold component 82 is such that the latter grips U-bend 45 sufficiently to permit mold 82 to apply the necessary torque to the tubing for the second bending operation when the mold is swung through the aforesaid arc.

Figure 12:
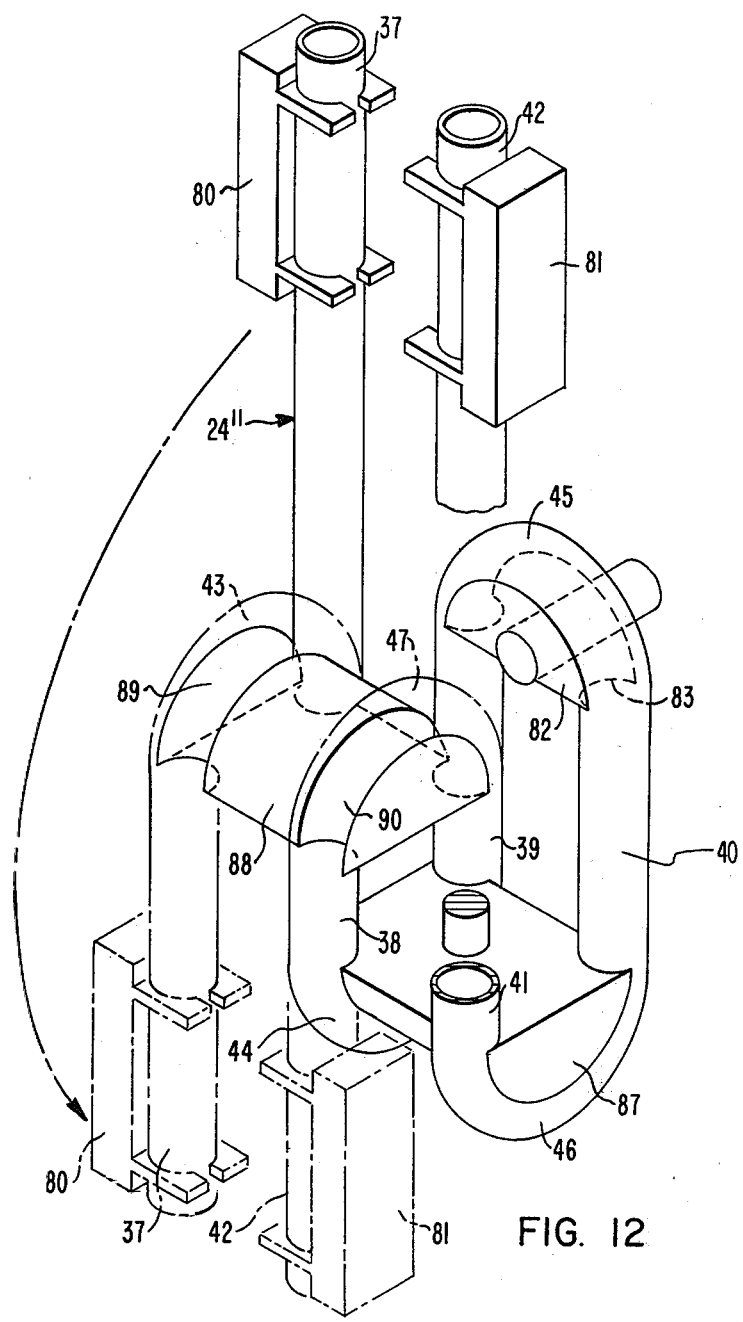

The third and final bending operation is shown in FIG. 12 and consists of placing a third preheated arcuate mold component 88 in contacting bridging relationship with the upstanding leg portions of the tubing 24" at a location above mold 87 so that the grooved work surfaces 89 and 90 of mold component 88 nestingly engage the tubing. With the first and second mold components 82 and 87 held stationary, the holders 80 and 81 (along with the gripped ends 37 and 42 of the tubing) are swung through arcs of approximately 180° (as indicated by the arrow) in the same plane but in the opposite direction relative to the second bending operation, thereby bending the legs of the tubing 24" around mold component 88 and forming an additional set of U-bends 43 and 47 that position the ends 37, 42 of the tubing adjacent the other pair of U-bends 44 and 46.

While the glass tubing is still hot and plastic, a stream of inert gas (such as compressed air) is preferably introduced into one end of the retrobent tubing 24" to produce a positive pressure and "round-out" any deformities in the circular shape of the tubing which may have occurred during the bending operations, especially in the U-bent regions.

If the retrobent glass tubing 24" is still in heat-softened condition, it is also then subjected to a stream of cool air to set the tubing on its new shape. The mold components 82, 87 and 88 are then rotated and manipulated to free them from the associated U-bends and permit them to be withdrawn from the finished envelope 24. Holders 80 and 81 are then opened and the released convoluted envelope 24 is transferred to a suitable annealing apparatus and subsequently subjected to the phosphor-coating, sealing-in operations, etc. required to transform it into a finished fluorescent lamp.

Figure 13:
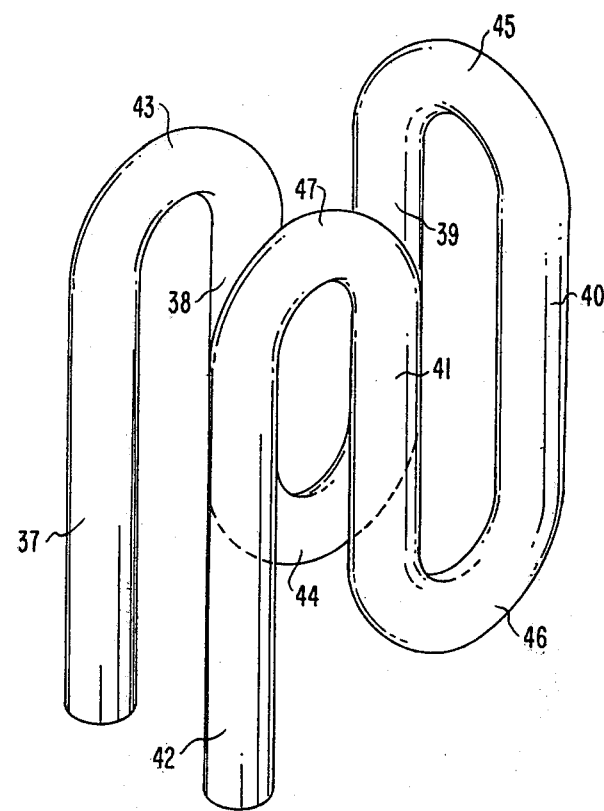
FIG. 13 is an isometric view of the multi-U-bent (five section) envelope produced by the bending operations illustrated in FIGS. 10-12.

The "three-fold" convoluted lamp envelope 24 produced by the aforementioned sequence of bending operations is shown in FIG. 13.

MANUFACTURE OF "FOUR-FOLD" TYPE LAMP ENVELOPE (FIGS. 14–17)

A method of forming a "four-fold" convoluted lamp envelope 24b (of the type shown in FIG. 5) from a single piece of glass tubing employing four sequential bending operations is shown in FIGS. 14–17.

Figure 14:
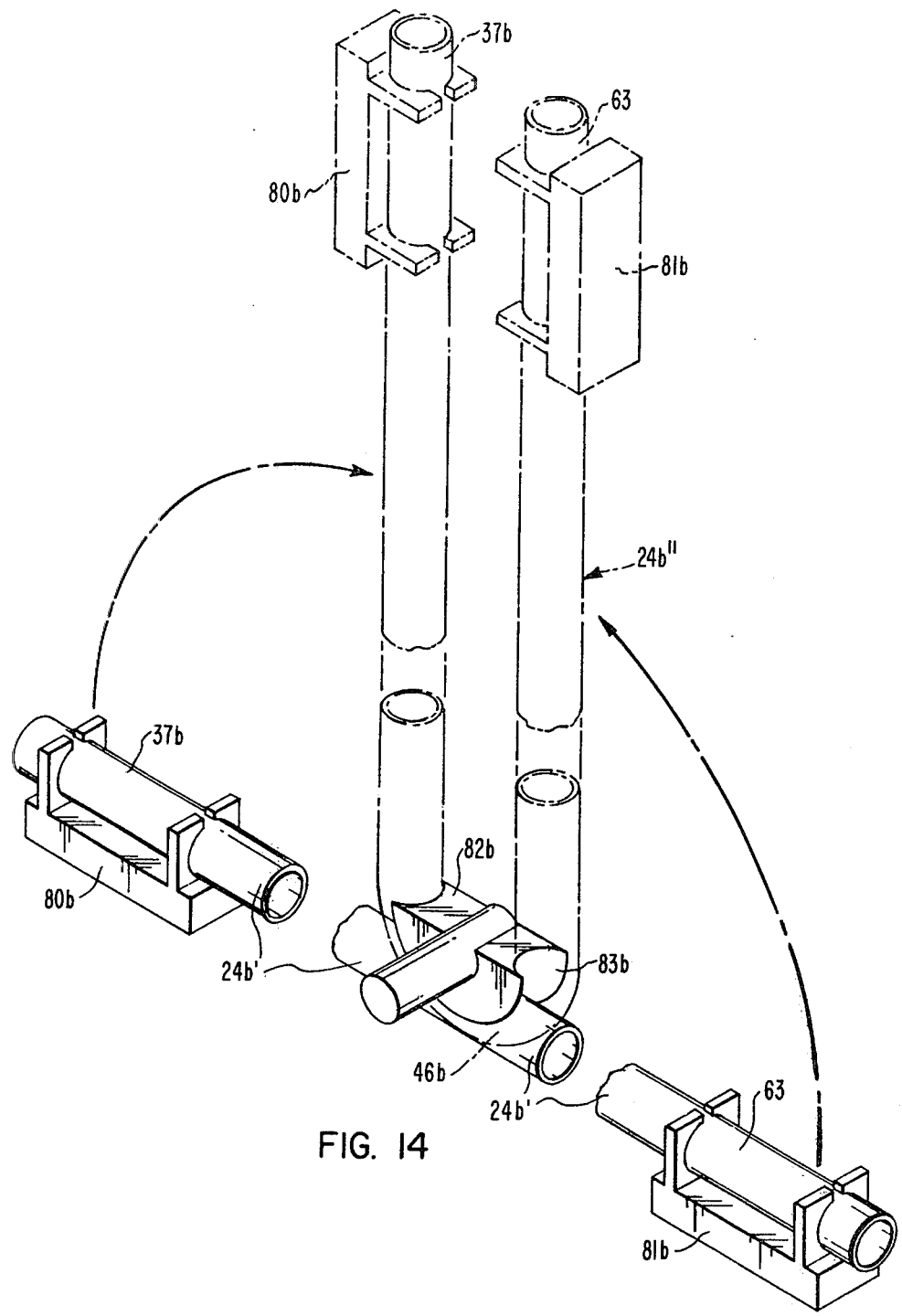
FIGS. 14-16 are pictorial views of the various bending operations required to form a convoluted seven-U-bent type fluorescent lamp envelope from a straight piece of glass tubing.
Figure 15:
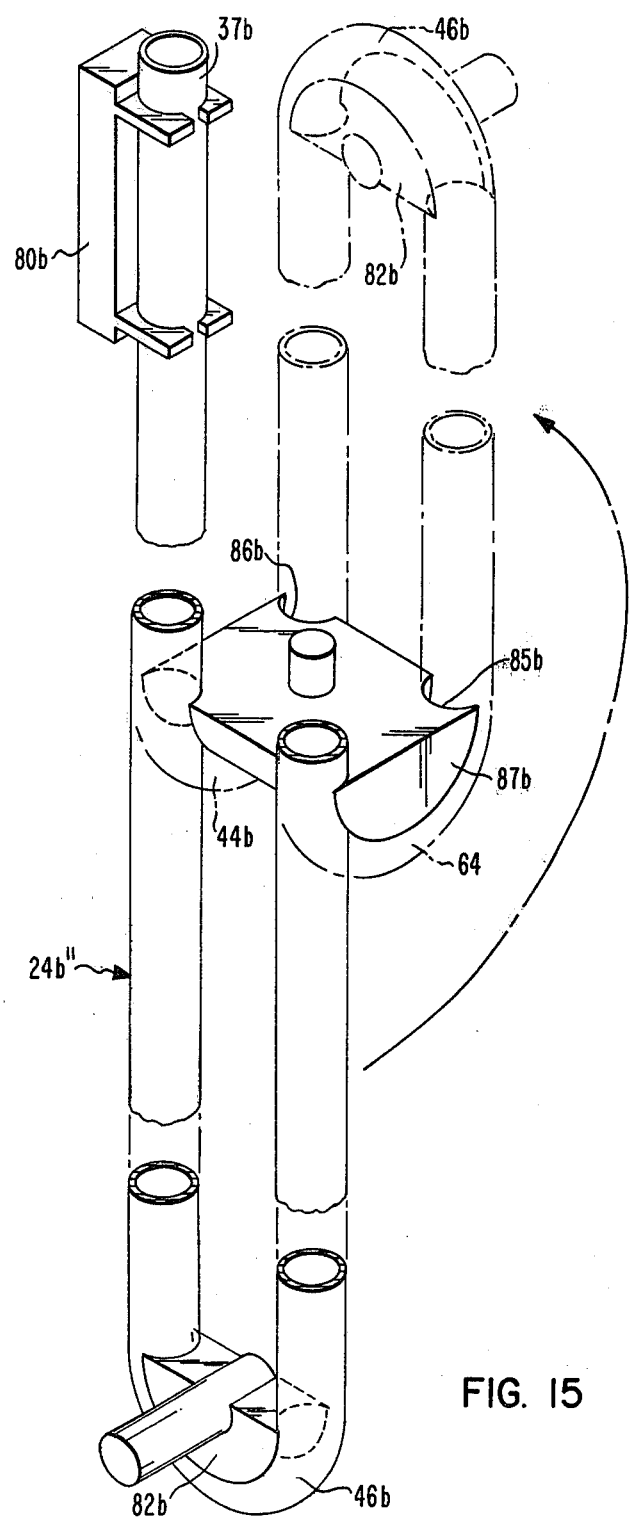

As will be noted in FIGS. 14 and 15, the first two bending operations are identical with those previously described in connection with the "three-fold" type envelope 24 and consist of gripping the rigid ends 63 and 37b of the straight tubing 24b' with suitable holders 80b and 81b and bending the heat-softened medial portion of the tubing around the grooved work surface 83b of a first mold component 82b, and then around a second mold component 87b to form the first three U-bends 44b, 46b and 64 (the reference numerals for the various portions of the bent glass tubing correspond with the numerals used to identify the same portions of the finished convoluted lamp envelope 24b). The first two bending operations are shown in FIGS. 14 and 15, respectively.

Figure 16:
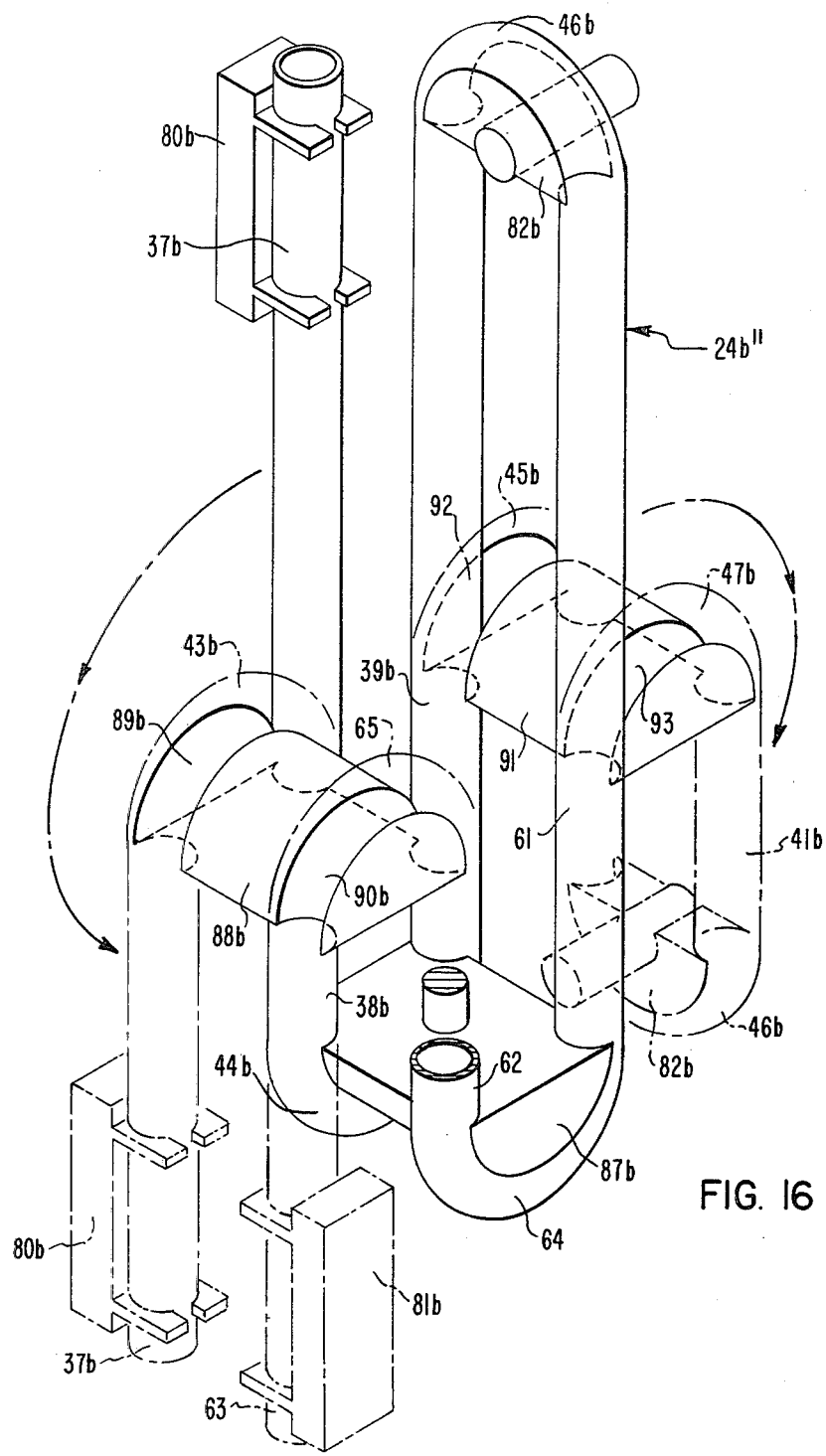

The third and fourth bending operations are depicted in FIG. 16 and are performed by positioning a third mold component 88b against the pair of upstanding leg portions of the tubing 24b" and a fourth arcuate mold component 91 against the other set of tubing legs and then bending the respective legs around the grooved work surfaces 89b, 90b of mold component 88b and around the grooved surfaces 92, 93 of mold component 91. This is achieved by swinging the gripped ends 37b and 63 of the tubing and the holders 80b, 81b through an arc 180° and also swinging the first mold component 82b and its interlocked U-bend 46b in the opposite direction through an arc of 180° (as indicated by the arrows) to form the last two pairs of U-bends 43b, 65 and 45b, 47b.

After the heat-softened tubing has been cooled and rigidified, the various mold components are rotated and withdrawn from the respective U-bends to provide the finished lamp envelope 24b shown in FIG. 17, which is then phosphor coated, etc. to provide the fluorescent lamp Lb (FIG. 5).

METHOD OF MANUFACTURING ALTERNATIVE "FOUR-FOLD" TYPE LAMP ENVELOPE (FIGS. 18–21)

A method of forming an alternative "four-fold" type lamp envelope 24c for a fluorescent lamp Lc of the kind shown in FIG. 7 is illustrated in FIGS. 18–21.

Figure 18:
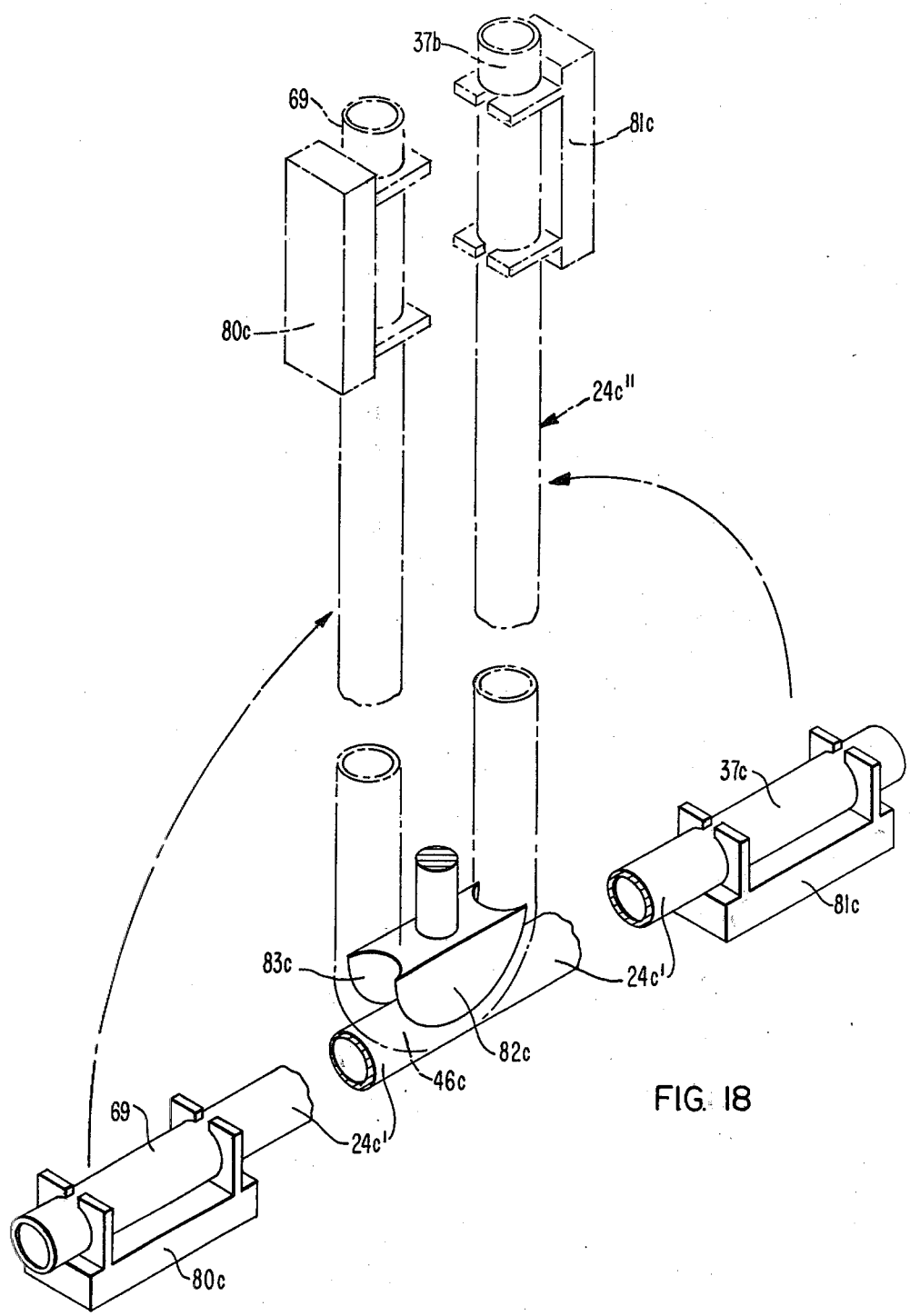
FIGS. 18-20 are pictorial views of the various bending operations required to form an alternative seven-U-bent type lamp envelope from a straight piece of glass tubing; and, FIG. 21 is an isometric view of the retrobent lamp envelope (seven-U-bent segments) produced by the bending operations illustrated in FIGS. 18-20.

The first step of the process is shown in FIG. 18 and is identical to that used in manufacturing both of the aforementioned convoluted lamp envelopes 24, 24c. It accordingly consists of bending a straight piece of glass tubing 24c' (which has been heat softened by fires or the like) into U-shape by gripping the rigid end portions 37c and 69 of the tubing with suitable holders 80c and 81c and swinging them toward each other through arcs of 90° to bend the central part of the tubing around a preheated arcuate mold component 82c. A groove 83c in the work face of the mold 82c engages the tubing and the resulting bend 46c transforms the straight tubing into an embryonic envelope 24c'' of U-shape.

Figure 19:
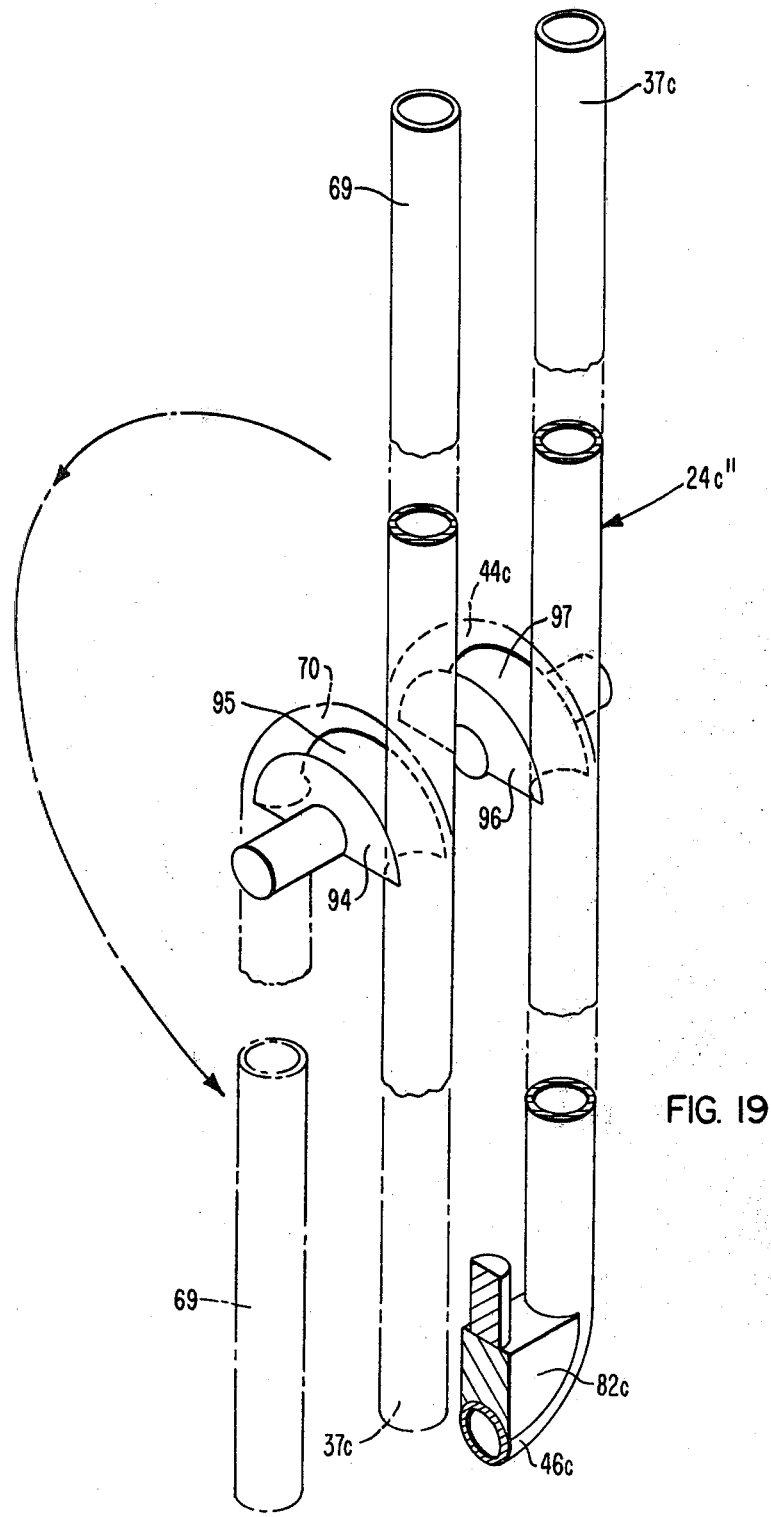

The next step is shown in FIG. 19 and consists of placing a pair of preheated arcuate mold components 94 and 96 against medial portions of the upstanding legs of the U-shaped tube 24c'' and swinging each of the rigid ends 37c and 69 of the tubing (by means of the holders 80c and 81c which are not shown in this figure) through an angle of 180° (indicated by the arrow) to bend the tubing around the grooved work faces 95 and 97, respectively, of the pair of mold components and thus form an additional pair of aligned U-bends 44c and 70 that position the ends of the tubing adjacent and opposite the first-formed U-bend 46c.

Figure 20:
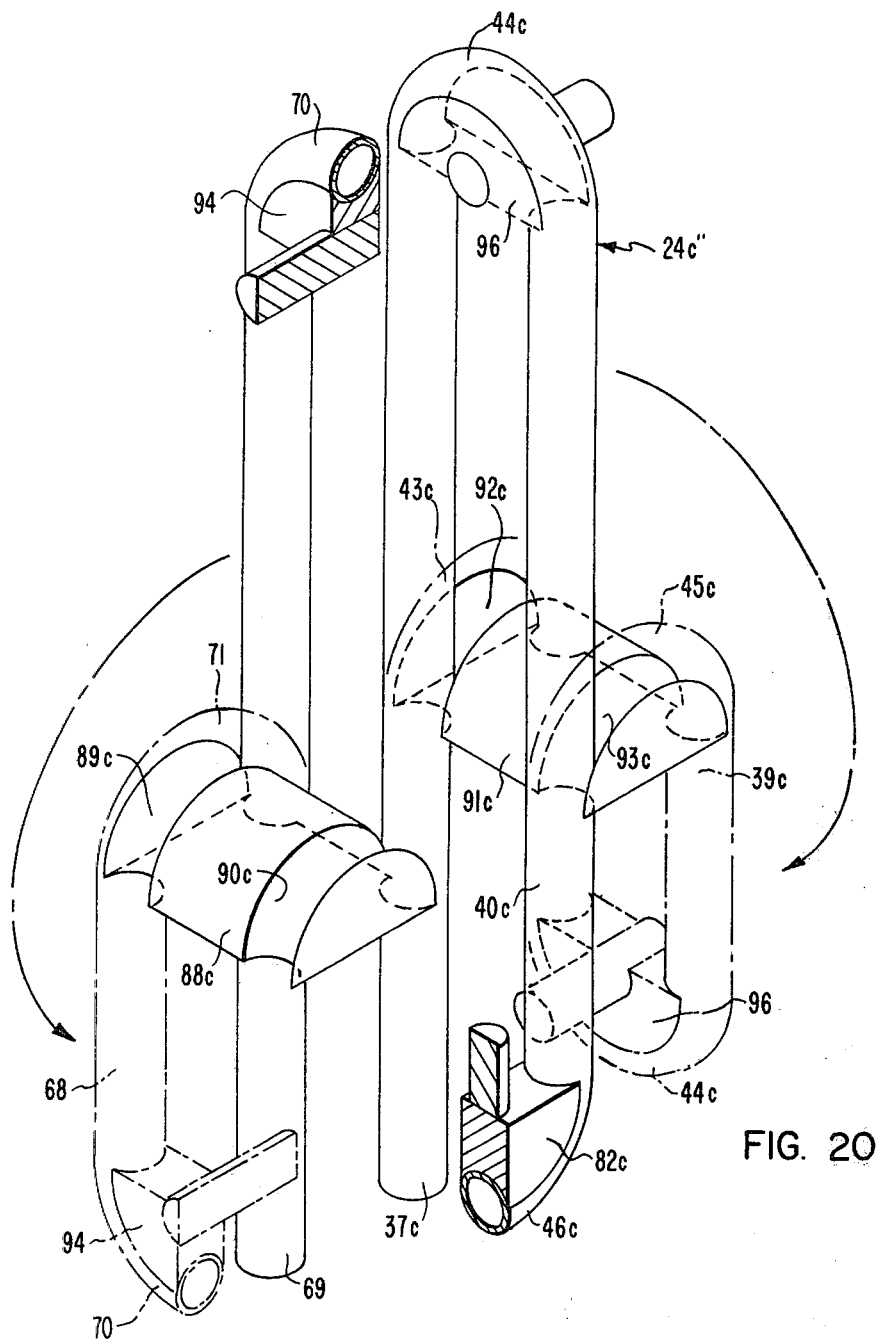

The third and fourth bending operations are shown in FIG. 20 and are achieved by placing another pair of preheated mold components 88c and 91c against medial portions of the four upstanding straight leg portions of the embryonic envelope component 24c'' so that the engaged portions of the glass tubing are seated in the arcuate grooved work faces 89c, 90c of mold component 88c and the grooved work faces 92c, 93c of the other mold component 91c. The first pair of mold components 94 and 96 are then swung (along with the associated U-bent portions 44c and 70 of the tubing) in opposite directions but in the same plane through angles of 180° (shown by the arrows) to form two additional aligned pairs of U-bends 43c, 45c and 47c (not shown), 71.

As shown in FIG. 20, the formation of these two additional pairs of U-bends places the previously-formed U-bent sections 44c and 70 on opposite sides of the tubing ends 37c, 69 and in parallel planes that are disposed at right angles to the plane that contains the end portions of the tubing and also to the common plane that contains the three conjoined U-bent segments 45c, 46c and 47c (not shown).

Figure 21:
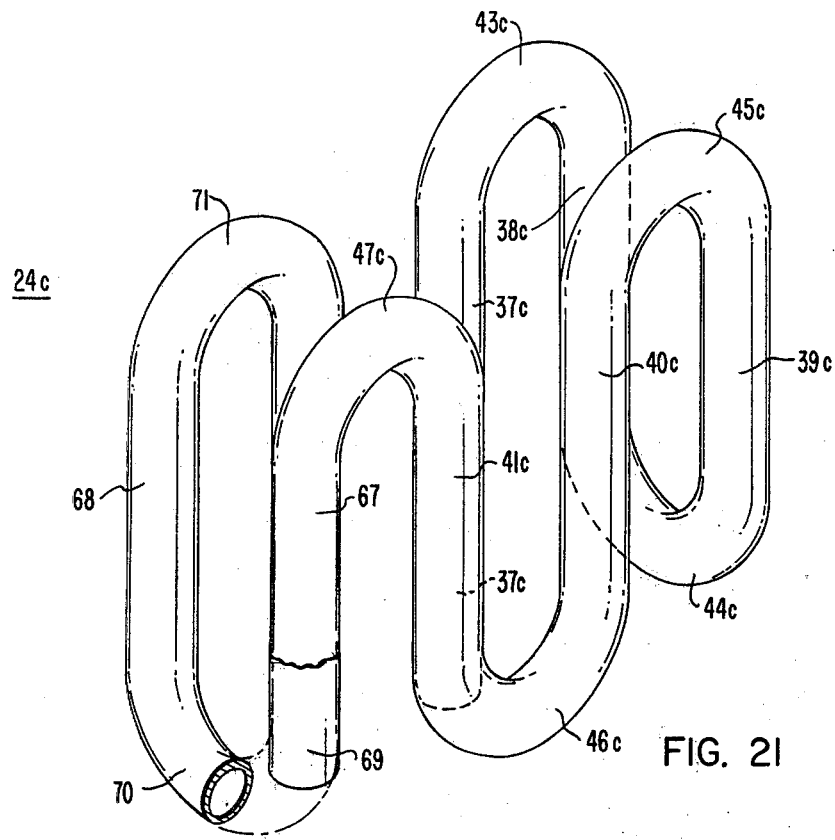

After the glass tubing has cooled sufficiently and rigidified, the various mold components are rotated and manipulated to remove them from the associated U-bent portions of the tubing to provide the finished envelope 24c shown in FIG. 21 (a portion of the envelope being omitted for illustrative purposes).

While it would simplify lamp manufacture to provide the straight piece of glass tubing with an inner coating of phosphor before it is heated and subjected to the various bending operations, the number of U-bends which are formed and the rather complex configuration of the convoluted envelopes are such that this mode of fabrication may not be practical. A more uniform phosphor coating, and a correspondingly enhanced lumen output of the finished fluorescent lamps, would probably be obtained by bending a clear glass tube into the desired shape and then coating it with phosphor—selected U-bent portions of the retrobent envelope being provided with tubulations to serve as phosphor-draining appendages as indicated previously. As will be noted in FIGS. 13, 17, and 21, the newly-formed envelopes 24, 24b and 24c have not been provided with such drainage tubulations.

As will be apparent to those skilled in the art, the tube-holders and various mold components are so constructed that they can be readily made parts of a single machine having drive means, indexing cams, etc. which actuate and move the holders and molds in the proper sequence automatically in a very precise and controlled manner so that they perform the various tube-bending operations, thus permitting the convoluted envelopes to be mass-produced and reducing the manufacturing cost of the fluorescent lamps and compact lamp units.

As will also be apparent to those skilled in the art, the novel multi-U-bent lamps of the present invention can be fabricated from glass tubing of various diameters and lengths to provide a family of compact tridimensional low-pressure discharge lamps and lamp units that have light outputs and electrical characteristics which permit them, when combined with suitable starting and operating circuits, to be used as direct replacements for incandescent lamps in many kinds of fixtures (table lamps, floor lamps, etc.)—thus not only conserving electrical energy but providing means for efficiently lighting homes and offices to suitable illumination levels at minimum cost.

I claim as my invention:

1. In an electric discharge lamp that contains a pair of spaced electrodes and an ionizable medium which sustains an arc discharge between the electrodes when the lamp is energized, the improvement comprising;
   a sealed tubular envelope of light-transmitting material having six substantially straight segments that are joined by five curved segments and together therewith form five generally U-shaped sections that merge with one another and define a single discharge channel of convoluted configuration,
   four of the conjoined generally U-shaped sections of said envelope being arranged in paired relationship and constituting two generally S-shaped sections that are disposed in different planes and are connected by the fifth generally U-shaped section,
   each of the generally U-shaped sections being so oriented that (a) the discharge channel is terminated by two of the substantially straight segments and (b) all of the substantially straight segments extend in the same general direction in columnar array and thus provide a light source that is tridimensional and of compact size.

2. In an electric discharge lamp that contains a pair of spaced electrodes and an ionizable medium which sustains an arc discharge between the electrodes when the lamp is energized, the improvement comprising;

a sealed tubular envelope of light-transmitting material having eight substantially straight segments that are joined by seven curved segments and together therewith form seven generally U-shaped sections that merge with one another and define a single discharge channel of convoluted configuration, six of the conjoined generally U-shaped sections of said envelope being arranged in paired relationship and constituting two generally M-shaped sections that are disposed in different planes and are connected by the seventh generally U-shaped section, each of the generally U-shaped sections being so oriented that (a) the discharge channel is terminated by two of the substantially straight segments, and (b) all of the substantially straight segments extend in the same general direction in columnar array and thus provide a light source that is tridimensional and of compact size.

3. In an electric discharge lamp that contains a pair of spaced electrodes and an ionizable medium which sustains an arc discharge between the electrodes when the lamp is energized, the improvement comprising;

a sealed tubular envelope of light-transmitting material having eight substantially straight segments that are joined by seven curved segments and together therewith form seven generally U-shaped sections that merge with one another and define a single discharge channel of convoluted configuration, three of the conjoined generally U-shaped sections of said envelope being located in a common plane and constituting a generally M-shaped section, the remaining generally U-shaped sections being disposed in different planes and being so oriented that (a) the discharge channel is terminated by two of the substantially straight segments which are proximate one another and disposed opposite the curved segment that constitutes the central portion of the generally M-shaped section, and (b) all of the substantially straight segments extend in the same general direction in columnar array and thus provide a light source that is tridimensional and of compact size.

4. The electric discharge lamp of claims 1, 2 or 3 wherein the curved segments of the convoluted tubular envelope are of such configuration that the substantially straight segments are spaced from one another.

5. The electric discharge lamp of claims 1, 2 or 3 wherein the substantially straight segments which constitute the ends of said convoluted tubular envelope contain the electrodes and are disposed in a plane that is spaced from and substantially parallel to the plane of the generally U-shaped section which constitutes the medial portion of the envelope.

6. The electric discharge lamp of claims 1, 2 or 3 wherein said convoluted envelope comprises a single piece of vitreous tubing that has a series of spaced arcuate bends which comprise said curved segments.

7. The electric discharge lamp of claims 1, 2 or 3 wherein said ionizable medium comprises a gaseous filling at a pressure below about 10 Torr and said discharge lamp is thus of the low-pressure type.

8. The low-pressure electric discharge lamp of claim 7 wherein the tubular envelope also contains a predetermined quantity of mercury and has a phosphor coating on its inner surface and said discharge lamp thus constitutes a fluorescent lamp.

9. An electric lamp unit adapted for use in lighting apparatus that requires a compact light source and includes socket means which is connected to circuit means which constitutes a part of said lighting apparatus, said lamp unit comprising, in combination;

the electric discharge lamp of claims 1, 2 or 3 wherein the said pair of electrodes are located within the channel-terminating substantially straight segments of the convoluted tubular envelope and are connected to lead-in conductors that extend from the respective substantially straight segments, and a base structure having terminal means adapted to effect electrical contact with the socket means of said lighting apparatus, said base structure being coupled to the channel-terminating substantially straight segments of the convoluted tubular envelope and together with said discharge lamp constituting a compact lamp unit of such physical size that it is suitable for use in said lighting apparatus and the socket means thereof.

10. The compact electric lamp unit of claim 9 wherein;

said circuit means is of the type that permits the discharge lamp to be operated on an alternating current power source.

11. The compact electric lamp unit of claim 9 wherein;

said base structure has a cup-shaped portion that circumscribes and accommodates the electrode-containing straight segments of the convoluted envelope and the adjacent U-bent segments thereof, and said cup-shaped portion has a panel-like member that supports the discharge lamp and has apertures therein which permit air to circulate through the base structure and around the convoluted tubular envelope and thus provide convection cooling for the discharge lamp during operation.

12. The compact electric lamp unit of claim 11 wherein;

said convoluted tubular envelope contains mercury and a fill gas and carries a phosphor coating on its inner surface and said lamp thus comprises a fluorescent lamp, and a light-diffusing cover is disposed in protective enclosing relationships with the convoluted fluorescent lamp and is held in such position by the base structure, said protective cover being open-ended and thus providing an air passageway that enhances the convection cooling of the fluorescent lamp during operation.

13. An electric lamp unit adapted for use in lighting apparatus that requires a compact light source and includes socket means, said lamp unit comprising, in combination;

the electric discharge lamp of claims 1, 2 or 3 wherein the said pair of electrodes are located within the channel-terminating substantially straight segments of the convoluted tubular envelope and are connected to lead-in conductors that extend from the respective substantially straight segments, said discharge lamp being of a type that inherently exhibits a decrease in light output when operated in an environment which causes the lamp to become overheated, a base structure having terminal means adapted to effect electrical contact with the socket means of said lighting apparatus, said base structure being coupled to the channel-terminating segments of the convoluted tubular envelope and together with said envelope constituting a compact unitary assembly, and a light-transmitting cover held in protective enclosing relationship with said discharge lamp by the base structure and having an opening which permits air to pass through the lamp unit and convection cool the discharge lamp when the lamp unit is placed in the socket means of the lighting apparatus.

14. The electric lamp unit of claim 13 wherein;

said base structure has a cup-shaped portion that circumscribes and accommodates the electrode-containing ends of the convoluted envelope and the adjacent U-bent segments thereof, and said cup-shaped portion includes a panel-like member that supports the discharge lamp and has a plurality of apertures therein which permit air to pass through the base structure and into and through the lamp unit when it is placed into the socket means of the lighting apparatus and is energized.

15. The electric lamp unit of claim 13 wherein;

said convoluted tubular envelope contains a predetermined amount of mercury and a fill gas and carries a phosphor coating on its inner surface and said lamp thus comprises a fluorescent lamp, said base structure is terminated by a bayonet type base member, and the socket means of the lighting apparatus is also of the bayonet-type.

16. In the manufacture of an electric lamp, the method of forming vitreous tubing that is initially substantially straight into a lamp envelope of convoluted configuration that has five conjoined U-bent segments, which method comprises the steps of;

heating a predetermined length of such substantially straight vitreous tubing in a manner such that the end portions thereof are rigid and the portions thereof which are to be reshaped are uniformly softened sufficiently to be bent without fracturing or collapsing, placing a first arcuate mold means against a heat-softened central portion of the tubing, gripping the rigid end portions of said tubing and swinging them toward one another along a common plane until the heat-softened central portion of the tubing is bent around said first mold means through an arc such that the tubing is U-shaped and the first U-bent segment is formed, placing a second mold means of arcuate configuration against heat-softened medial parts of each of the leg portions of the U-shaped tubing and, while maintaining the gripped end portions of the tubing stationary, swinging the said first-formed U-bent segment and the first mold means through an arc of approximately 180° along a path which is substantially normal to the plane of the first bending operation and thereby simultaneously bending both of the heat-softened medial parts of said leg portions around the second mold means and forming an additional pair of U-bent segments which are aligned with one another and position the neck of the first-formed U-bent segment proximate the gripped end portions of the tubing, placing a third arcuate mold means against heat-softened parts of both legs of the tubing at a predetermined location near the gripped end portions of the tubing and, while maintaining the three previously-formed U-bent segments and associated mold means stationary, swinging each of the gripped end portions through an arc of approximately 180° in a direction which is opposite to that in which the second bending operation was performed and along paths which are also substantially normal to the plane of the first bending operation and thereby simultaneously bending the heat-softened parts of said legs around the third mold means and forming two additional U-bent segments in the tubing which are aligned with one another and position the gripped end portions of the tubing adjacent the second-formed pair of U-bent segments, and then cooling the resulting multi-U-bent tubular envelope to rigidify and set the vitreous tubing in its convoluted configuration and removing said first, second and third mold means.

17. In the manufacture of an electric lamp, the method of forming vitreous tubing that is initially substantially straight into a lamp envelope of compact convoluted configuration that has seven conjoined U-bent segments, which method comprises the steps of;

heating a predetermined length of such substantially straight vitreous tubing in a manner such that the end portions thereof are rigid and the portions thereof which are to be reshaped are uniformly heated sufficiently to be bent without fracturing or collapsing, placing a first arcuate mold means against a central portion of the tubing which has been heat-softened, gripping the rigid end portions of said tubing and swinging them toward one another along a common plane until the heat-softened central portion of the tubing is bent around said first mold means through an arc such that the tubing is U-shaped and the first U-bent segment is formed, placing a second mold means of arcuate configuration against heat-softened medial portions of each of the leg segments of the U-shaped tubing and, while maintaining the gripped end portions of the tubing stationary, swinging the first-formed U-bent segment and first mold means through an arc of approximately 180° along a path which is substantially normal to the plane of the first bending operation and thereby simultaneously bending both of the heat-softened medial portions of the leg segments around said second mold means and forming an additional pair of U-bent segments in the tubing which are aligned with one another and position the neck of the first-formed U-bent segment proximate the gripped end portions of the tubing, placing (a) a third arcuate mold means against heat-softened parts of both legs of the tubing at a location between the neck of the first-formed U-bent segment and the second-formed pair of U-bent segments and (b) a fourth arcuate mold means against heat-softened parts of both legs of the tubing at a predetermined location proximate but spaced from the gripped end portions of the tubing, swinging the gripped end portions of the tubing and first-formed U-bent segment in opposite directions through arcs of approximately 180° along paths that lie in a common plane and thereby bending the respective heat-softened parts of the tubing legs around the said third and fourth mold means and forming them into two pairs of aligned U-bent segments that position the gripped end portions of the tubing and the first-formed U-bent segment adjacent but on opposite sides of the second-formed pair of U-bent segments, and then cooling the resulting multi-U-bent tubular envelope to rigidify and set the vitreous tubing in its convoluted configuration and removing said first, second, third and fourth mold means.

18. In the manufacture of an electric lamp, the method of forming vitreous tubing that is initially substantially straight into a lamp envelope of compact convoluted configuration that has seven conjoined U-bent segments, which method comprises the steps of;

heating a predetermined length of such substantially straight vitreous tubing in a manner such that the end portions thereof are rigid and the portions of the tubing which are to be reshaped are uniformly heated sufficiently to be bent without fracturing or collapsing, placing a first arcuate mold means against a heat-softened central portion of the tubing, gripping the rigid end portions of said tubing and swinging them toward one another along the common plane until the heat-softened central portion of the tubing is bent around said first mold means through an arc such that the tubing is U-shaped and the first U-bent segment was formed, placing second and third mold means of arcuate configuration against heat-softened medial parts of each of the leg portions of the U-shaped tubing and, while maintaining the first-formed U-bent segment of the tubing stationary, swinging the gripped end portions of the tubing in the same direction through arcs of approximately 180° along paths which are substantially normal to the plane of the first bending operation and thereby simultaneously bending both of the heat-softened medial parts of the leg portions around the second and third mold means and forming second and third U-bent segments which are aligned with one another and position the gripped end portions of the tubing proximate the neck of the first-formed U-bent segment, placing fourth and fifth arcuate mold means in contact and bridging relationship with heat-softened medial parts of the four respective leg portions of the second and third U-bent segments and, while maintaining the first-formed U-bent segment stationary, swinging the second-formed and third-formed U-bent segments of the tubing in opposite directions through arcs of approximately 180° and thereby simultaneously bending the said medial parts of the four leg portions of the tubing around the fourth and fifth mold means and forming four additional U-bent segments that are arranged in pairs and position the second-formed and third-formed U-bent segments on opposite sides of the first-formed U-bent segment, and then cooling the resulting multi-U-bent tubular envelope to rigidify and set the vitreous tubing in its convoluted configuration and removing said first, second, third, fourth and fifth mold means.

19. The envelope-forming method of claims 16, 17 or 18 wherein;

said vitreous tubing is of substantially circular cross-section, and a pressurized stream of inert gas is introduced into the tubing, after the bending operations have been completed and the tubing is still in heat-softened condition, to subject the walls of the tubing to positive pressure and thereby substantially correct any deformities in the U-bent portions of the tubing that may have been produced by the heating and bending operations.

20. The envelope-forming method of claim 19 wherein a coating of phosphor material is deposited on the inner surface of the vitreous tubing before the tube-bending operations are performed.

21. The envelope-forming method of claim 19 wherein a coating of phosphor material is deposited on the inner surface of the vitreous tubing after all of the tube-bending operations have been performed and the resulting multi-U-bent envelope has cooled and rigidified.

* * * * *